(12) United States Patent  
Denno

(10) Patent No.: US 6,993,064 B2
(45) Date of Patent: Jan. 31, 2006

(54) MULTI-USER RECEIVING METHOD AND RECEIVER

(75) Inventor: Satoshi Denno, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 807 days.

(21) Appl. No.: 10/028,357

(22) Filed: Dec. 28, 2001

(65) Prior Publication Data

US 2002/0126779 A1 Sep. 12, 2002

(30) Foreign Application Priority Data

Dec. 28, 2000 (JP) .............................. 2000-402958

(51) Int. Cl.
*H04B 1/69* (2006.01)
*H04B 1/707* (2006.01)
*H04B 1/713* (2006.01)

(52) U.S. Cl. ...................... 375/136; 375/144; 375/148; 375/316; 370/335; 370/342; 700/53

(58) Field of Classification Search ................ 375/349, 375/136, 144, 148; 370/342, 335; 700/53
See application file for complete search history.

(56) References Cited

U.S. PATENT DOCUMENTS

| | | | | |
|---|---|---|---|---|
| 5,712,871 | A * | 1/1998 | Chang .......................... | 375/141 |
| 5,970,060 | A | 10/1999 | Baier et al. ................... | 370/342 |
| 6,725,025 | B1 * | 4/2004 | Schmidl et al. ........... | 455/278.1 |
| 2002/0154717 | A1 * | 10/2002 | Shima et al. ................ | 375/349 |

FOREIGN PATENT DOCUMENTS

EP 0 725 488 8/1996

OTHER PUBLICATIONS

J.-T. Chen, et al., ICC 98, IEEE International Conference, XP-010284765, pp. 704-708, "Low Complexity Joint MLSE Receiver in the Presence of CCI", Jun. 7-11, 1998.
L. B. Nelson, et al., IEEE Transactions on Communications, vol. 44, No. 12, XP-002902202, pp. 1700-1710, "Iterative Multiuser Receivers for CDMA Channels: An EM-Based Approach", Dec. 1996.
B. H. Fleury, et al., IEEE Journal on Selected Areas in Communications, vol. 17, No. 3, XP-000804973, pp. 434-449, "Channel Parameter Estimation in Mobile Radio Environments Using the Sage Algorithm", Mar. 1999.
C. N. Georghiades, et al., IEEE Transactions on Communications, vol. 45, No. 3, XP-000690573, pp. 300-308, "Sequence Estimation in the Presence of Random Parameters via the EM Algorithm", Mar. 1, 1997.

(Continued)

*Primary Examiner*—Juan Alberto Torres
(74) *Attorney, Agent, or Firm*—Oblon, Spivak, McClelland, Maier & Neustadt, P.C.

(57) ABSTRACT

A receiver is provided, in which the receiver includes K signal extraction parts, a signal estimation part, K joint probability calculation parts and a multiplying part, wherein: an ith ($1 \leq i \leq K$) signal extraction part extracts ith to Kth user signals; an ith joint probability calculation part calculates a joint probability density function that any signal set in the ith to Kth user signals will be obtained if ith to Kth user signals estimated by the signal estimation part are assumed to be received; the multiplying part multiplies probability density functions calculated by the joint probability calculation parts; and the signal estimation part estimates first to Kth user signals which maximize the multiplied value, and outputs the first to Kth user signals.

16 Claims, 26 Drawing Sheets

OTHER PUBLICATIONS

A. Kocian, et al., IEEE International Symposium on Personal, Indoor and Mobile Radio Communications, vol. 2, XP-002902206, pp. 1410-1414, "Interative Joint Symbol Detection and Channel Estimation for DS/CDMA via the Sage Algorithm", Sep. 18, 2000.

* cited by examiner

MULTI-USER RECEIVING METHOD AND RECEIVER

BACKGROUND OF THE INVENTION

1. Field of the Invention

The present invention relates to a receiving method and an receiving apparatus for estimating first to Kth (K≧2) user signals among a plurality of user signals transmitted over the same communication channel. More particularly, the present invention relates to a receiving method and a receiving apparatus for canceling interference due to undesired signals.

2. Description of the Related Art

As a technique for canceling interference caused by undesired signals in a receiver of a digital wireless communication system, there is a method for canceling interference caused by adjacent channels or interference caused by other systems by using an adaptive transversal filter. However, interference from the same channel (same channel interference) can not be canceled according to this method. In addition, there is a method for canceling interference by using error correction code and coded modulation. However, according to this method, effects of the interference are merely decreased by widening a distance between code word in received signals. Thus, interference can not be canceled substantially according to this method.

On the other hand, a vector sequence estimation method is proposed in which an interference signal is estimated and the interference signal is subtracted from a received signal so that an interference component is removed. According to this method, channel impulse responses of an interference signal and a desired signal are estimated, and the interference signal and the desired signal are estimated based on the estimation result of the channel impulse responses. According to this method, since the interference component is positively estimated and the effect of the interference is removed, good interference canceling characteristics can be obtained even when a strong interference signal exists. However, it is necessary to know the number of interference signals beforehand for performing this vector sequence estimation method. In addition, the interference signal and the desired signal can be hardly distinguished from each other when levels of them are close. Thus, there is a problem in that interference canceling ability deteriorates.

On the other hand, as for spread spectrum (CDMA) system, a method is known in which, when interference due to other user signal using other spreading code occurs, an inverse matrix of spreading code word formed by the interference signal and the desired signal is operated on input signal series by using a decorrelating detector so that the interference is canceled. In this case, an MMSE (minimizing mean squared error) type interference canceler and the like may be used. In the MMSE (minimizing mean squared error) type interference canceler, the inverse matrix used by the decorrelating detector is regarded as a variable, and the variable is estimated such that the interference component in an output signal becomes minimum.

In addition, in the spread spectrum system, an interference canceling method by using a multistage interference canceler is used. In this interference canceling method, a transversal filter which uses code word as tap coefficients demodulates an interference signal, and spreads the signal again after hard decision. Then, the spread signal is convoluted with impulse response of the communication channel so that the interference signal is removed from the received signal. After that, a matched filter having code word of the desired signal demodulates the interference removed signal. Then, the signal is decided, redemodulated and convoluted with impulse response, and subtracted from the received signal so that the interference signal is removed. Further, a matched filter including code word of the interference signal demodulates the signal in which the interference is removed. Then, the signal is demodulated, decided, redemodulated and convoluted with impulse response, and subtracted from the received signal so that the interference signal is removed. The interference signal is removed from the received signal by repeating the processes.

The multistage interference canceler removes interference component included in the received signal basically by using a hard decided signal so that the interference is decreased to some extent. After that, transmission characteristic can be improved by performing matched filer receiving. As for CDMA, relatively good transmission characteristics can be obtained since there is a certain Hamming distance between spreading codes assigned to users. However, since hard decision is performed, the transmission characteristic deteriorates compared with that of optimally received signal.

In multimedia communication in the future, high-speed signal transmission becomes necessary. For the high-speed signal transmission, it is necessary to use lower spreading ratio of CDMA such that the spreading ratio does not exceed the limit of process speed of hardware. However, if the spreading code is lowered, the ability of interference canceling is lowered. Thus, an interference canceling apparatus having higher performance becomes necessary.

As for mobile communication, since there are more subscribers than those of cable systems, a cellular system is adopted for accommodating signals of many users in a frequency band, in which the same frequency is assigned to places which are apart. In the cellular system, a signal transmitted in a cell using a frequency may be propagated to another cell which uses the same frequency according to the environment of the service area.

Therefore, strong same channel interference often occurs in the cellular system. In this case, the interference can be decreased by using antenna directivity. For example, it is known that using adaptive array antenna which changes directivity according to change of propagation environment in mobile communications is effective, in which wireless propagation environment of the communication channel in the mobile communications changes every moment according to movement of terminals and peripheral devices.

In the adaptive array antenna, assuming that the number of antenna elements is N, N−1 interference signals can be suppressed. However, it is known that the transmission characteristics remarkably deteriorate if interference signals more than N−1 arrive. For reducing this deterioration, a spatial region multistage interference canceler is proposed in which the adaptive array antennas are structured as a multistage structure for suppressing interference. However, this method is equivalent to adopting adaptive arrays instead of ICU (Interference Canceling Unit) which performs demodulation of interference signal, hard decision and removes interference component based on hard decision signal in the CDMA multistage interference canceler. Therefore, since the spatial region multistage interference canceler can perform only hard decision like the CDMA multistage interference canceler, the spatial region multistage interference canceler can not perform optimal receiving so that transmission characteristics deteriorate. Especially, since any value corresponding to the Humming distance between codes of the CDMA multistage interference canceler does not exist in the spatial region multistage interference canceler, the degree of deterioration of transmission characteristics due to hard decision is larger.

SUMMARY OF THE INVENTION

An object of the present invention is to provide a receiving method and a receiving apparatus which can suppress transmission characteristics deterioration due to hard decision when a plurality of user signals are transmitted on the same communication channel so that communication quality can be improved.

The above object can be achieved by a receiving method in a receiver demodulating K user signals in a plurality of user signals transmitted on the same communication channel, the receiver including K signal extraction parts, a signal estimation part, K joint probability calculation parts and a multiplying part, the receiving method including the steps of:

an ith ($1 \leq i \leq K$) signal extraction part extracting ith to Kth user signals;

an ith joint probability calculation part calculating a joint probability density function that any signal set in the ith to Kth user signals will be obtained if ith to Kth user signals estimated by the signal estimation part are assumed to be received;

the multiplying part multiplying probability density functions calculated by the joint probability calculation parts so that a multiplied value is obtained; and the signal estimation part estimating first to Kth user signals which maximize the multiplied value, and outputting the first to Kth user signals to the joint probability calculation parts.

According to this receiving method, transmission characteristics degradation due to hard decision can be suppressed so that communication quality improves by extracting predetermined number of user signals from received signals and by estimating each user signal such that joint probability density function of the extracted user signals and estimated user signals becomes maximum. Especially, in a wireless communication system, since high quality communication becomes possible even under interference to some extent, the distance between areas where the same frequency is used can be shorten so that frequency use efficiency in the plane directions can be improved. The joint probability density function that the any signal set in ith to Kth user signals extracted by the ith signal extraction part will be obtained if ith to Kth user signals estimated by the signal estimation part are assumed to be received is a probability called a joint probability density function. In an environment in which transmission states vary every moment such as in mobile communications, received power of a signal of each user also varies. In terms of performing demodulation having the maximum likelihood by determining which user signals should be extracted such that the joint probability density function becomes maximum, the receiver may further includes a user estimation part, and the receiving method may further includes the steps of:

the user estimation part determining which user signals should be extracted by the signal extraction parts according to variation of communication channel state such that the probability density functions obtained by the joint probability calculation parts become maximum; and the signal extraction parts extracting user signals determined by the user estimation part.

The above object can be also achieved by a receiving method in a receiver demodulating K user signals in a plurality of user signals transmitted on the same communication channel, the receiver including K signal extraction parts, a signal estimation part, K log likelihood calculation parts and an adding part, the receiving method including the steps of:

an ith ($1 \leq i \leq K$) signal extraction part extracting ith to Kth user signals;

an ith log likelihood calculation part calculating a logarithm of a joint probability density function that any signal set in the ith to Kth user signals will be obtained if ith to Kth user signals estimated by the signal estimation part are assumed to be received;

the adding part adding logarithms calculated by the log likelihood calculation parts so that an added value is obtained; and the signal estimation part estimating first to Kth user signals which maximize the added value, and outputting the first to Kth user signals to the log likelihood calculation part.

According to this receiving method, transmission characteristics degradation due to hard decision can be suppressed so that communication quality improves by extracting predetermined number of user signals from received signals and by estimating each user signal such that logarithm of joint probability density function of the extracted user signals and estimated user signals becomes maximum. In addition, since the logarithm is calculated instead of using the joint probability density function itself, computing amount in the receiver can be decreased. Especially, in a wireless communication system, since high quality communication becomes possible even under interference to some extent, the distance between areas where the same frequency is used can be shorten so that frequency use efficiency in the plane directions can be improved.

In terms of performing demodulation having the maximum likelihood by determining which user signals should be extracted such that the joint probability density function becomes maximum, the receiver may further includes a user estimation part, and the receiving method may further includes the steps of:

the user estimation part determining which user signals should be extracted by the signal extraction part according to variation of communication channel state such that the logarithms obtained by the log likelihood calculation parts become maximum; and the signal extraction parts extracting user signals determined by the user estimation part.

In terms of changing parameters (weight coefficients) of adaptive array according to change of communication channel state in a signal extraction method of canceling predetermined signals depending on incident angle of signals, the receiver may further includes K adaptive control parts, the receiving method may further include the steps of:

an ith adaptive control part determining weight parameters on the basis of received signals and ith to Kth user signals estimated by the signal estimation part according to variation of communication channel state; and the ith signal extraction part assigning weights to the received signals by using the weight parameters.

In addition, the receiver may further include an adaptive control part, and the receiving method may further includes the steps of:

the adaptive control part determining weight parameters on the basis of received signals according to variation of communication channel state, and each of the signal extraction parts assigning weights to received signals by using weight parameters determined by the adaptive control part.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
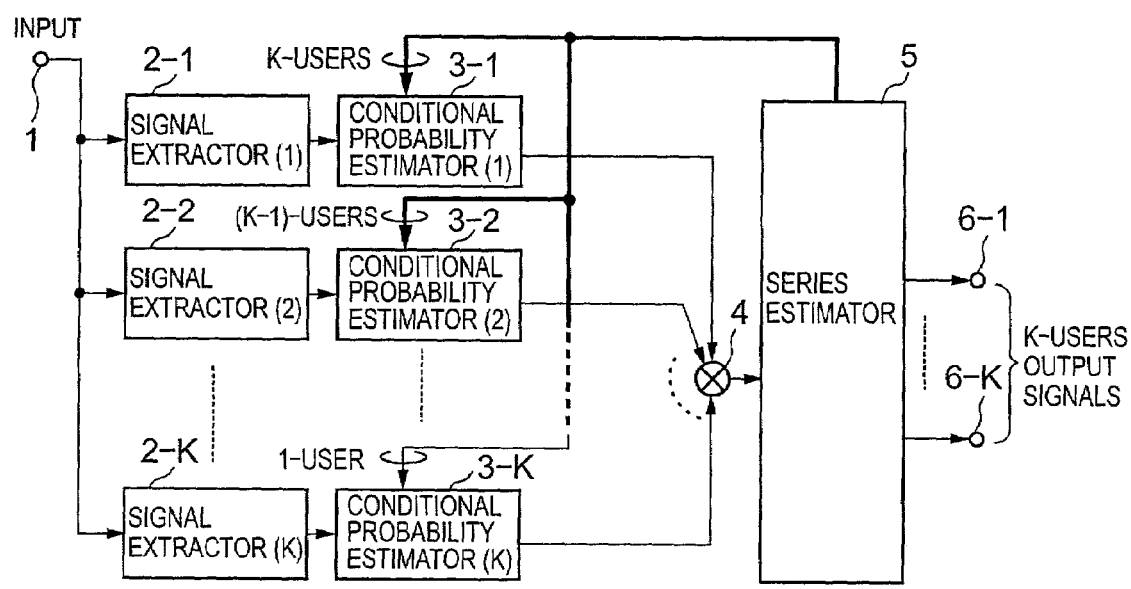
FIG. 1 is a first configuration example of a receiver which estimates sending signal series which maximizes a joint probability density function according to a first embodiment.

In the following, embodiments of the present invention will be described. A system in which N users perform signal transmission by using the same channel at the same time and demodulates K user signals in the N user signals will be considered in the following. A receiver in the system forms multi-channels (K channels here) for separating the K user signals, and an output signal from each multi-channel is decided so that K user signals are demodulated accurately.

Assuming that a demodulation signal vector $D_k$ is represented by $D_k=[d_1(k),d_1(k-1), \ldots ,d_1(0),d_2(k), \ldots ,d_K(0)]^T$, and received signals $R_k$ which passed through the multi-channel are represented by $R_k=[r_1(k),r_2(k-1), \ldots ,r_K(0)]^T$. MAP (Maximum Aposteriori Estimation) method is known as an estimation method for minimizing error rate of the demodulation signal. The MAP estimation method estimates sending signal series which maximize joint probability density function of sending and receiving signals. In this embodiment, the receiver estimates the sending signal series which maximize the joint probability density function represented by a following equation (1).

$$P(r_1(k)r_2(k-1) \ldots r_K(0)d_1(k)d_1(k-1) \ldots d_K(k) \ldots d_N(0)) \quad (1)$$

When the equation (1) is modified by the Bayes rule, $$\begin{aligned}
&P(r_1(k)r_1(k-1) \ldots r_K(0)d_1(k)d_1(k-1) \ldots d_K(k) \ldots d_N(0)) = \\
&P(r_1(k)r_1(k-1) \ldots r_K(0)d_1(k)d_1(k-1) \ldots d_K(k) \ldots d_{N-1}(0) | \\
&\quad d_N(k) \ldots d_N(0)) \cdot P(d_N(k) \ldots d_N(0)) = \\
&P(r_1(k)r_1(k-1) \ldots r_K(0)d_1(k)d_1(k-1) \ldots d_K(k) \ldots d_K(0) | \\
&\quad d_{K+1}(k) \ldots d_{K+1}(0)) \cdot \\
&\prod_{m=K+1}^{N-1} P(d_n(k) \ldots d_n | d_{n+1}(k) \ldots d_N(0)) = \\
&P(r_1(k) \ldots r_{K+1}(0)d_1(k) \ldots d_{K-1}(k) | r_k(k) \ldots r_k(0)d_k(k) \\
&\quad \ldots d_N(0)) \cdot P(r_k(k) \ldots r_k(0) | d_K(k) \ldots d_N(0)) \\
&\prod_{m=K+1}^{N-1} P(d_n(k) \ldots d_n(0) | d_{n+1}(k) \ldots d_N(0)) = \\
&\prod_{m=1}^{K} P(r_m(k) \ldots r_m(0) | r_{m+1}(k) \ldots r_N(0)d_m(k) \ldots d_N(0)) \cdot \\
&\prod_{m=K+1}^{N-1} P(d_n(k) \ldots d_n(0) | d_{n+1}(k) \ldots d_N(0))
\end{aligned} \quad (2)$$

is obtained.

Generally, since sending signals of each user are independent of one another, a joint probability density function of the last term in the equation (2) becomes the following equation (3).

$$\prod_{n=K+1}^{N} P(d_n(k) \ldots d_n(0) \mid d_{n-1}(k) \ldots d_N(0)) = \prod_{l=0}^{k} \prod_{n=K+1}^{N} P(d_n(l)) \quad (3)$$

Normally, since incidence probability of each sending signal is uniform, contribution of the term of the equation (3) can be neglected in the equation (2). The sending signal series which maximizes the joint probability density function of the equation (1) in this condition, that is, maximizes a conditional probability density function can be estimated by MLSE (Maximum Likelihood Sequence Estimation). In this embodiment, the sending signal series which maximizes the conditional probability density function shown in the following equation (4) is estimated by the receiver according to the maximum likelihood sequence estimation.

$$\prod_{m=1}^{K} P(r_m(k) \ldots r_m(0) \mid r_{m+1}(k) \ldots r_K(0) d_m(k) \ldots d_N(0)) \quad (4)$$

In a communication channel which can store finite time $L_\tau$ symbols, only signals included in a time window of $L_\tau$ before a time k contributes the conditional probability density function at the time k. Therefore, in this case, the equation (4) can be rewritten into the equation (5).

$$\prod_{m=1}^{K} P(r_m(k) \ldots r_m(0) \mid r_{m+1}(k) \ldots r_K(0) d_m(k) \ldots d_N(0)) =$$

$$\prod_{m=1}^{K} P(r_m(k) \mid r_{m+1}(k) \ldots r_K(k) d_m(k) \ldots d_m(k - L_\tau) \ldots d_N(k - L_\tau)) \quad (5)$$

The conditional probability density function $P(r_m(k) \mid r_{m+1}(k) \ldots r_K(k) d_m(k) \ldots d_m(k-L_\tau) \ldots d_N(k-L_\tau))$ in the equation (5) indicates that a receiving signal of mth channel is estimated by channels after the (m+1)th channel and by sending candidate signals of channels after mth channel. In other words, the mth channel is independent of signals of channels before (m−1)th channel. This is the condition for performing MLSE by using likelihood function. Under this condition, most likely K user signals can be demodulated by estimating the sending signal series which maximizes the conditional probability density function represented by the equation (5). When the condition of MLSE is not satisfied, the receiver estimates sending probability of code according to the equation (3), and estimates the sending signal series which maximizes the probability represented by the equation (2) on the basis of the sending probability so that most likely K user signals can be demodulated.

Vector Viterbi algorithm and vector sequential decoding algorithm can be used as the estimation method of the sending signal series which maximizes the conditional probability density function of the equation (5). The vector Viterbi algorithm can perform the process by using a constant computing amount. On the other hand, computing amount changes depending on SNR (signal-to-noise ratio) according to the vector sequential algorithm.

In the vector Viterbi algorithm, a signal set $[(r_{m+1}(k) \ldots r_K(k) d_m(k) \ldots d_m(k-L_\tau) \ldots d_N(k-L_\tau))]$ is regarded as a state, and every occurrence state of the signal set is generated, so that the signal set which maximizes the equation (5) is estimated.

On the other hand, the vector sequential decoding algorithm generates some surviving vectors. Then, according to time series following time series of the sending signal vector having highest probability among them, the vector is time-series updated. Then, likelihood is calculated, and likelihood of the time-series updated vector is compared with that of the surviving vectors which are not time-series updated. If the likelihood of the other surviving vector becomes larger than that of the time-series updated vector, the time series update is stopped and other surviving vectors are newly time-series updated. Accordingly, demodulation is performed for signals sent in finite block units.

When such estimation of the sending signal series is performed, joint probability density function on the sending signal series and the received signal is necessary. For example, joint probability density function is obtained from known sending signal and received signal, and the sending signal series can be estimated by using the joint probability density function. In addition, when distribution of noise applied in the communication channel is Gaussian distribution, a probability density function can be represented by $$P(x_k \mid y_k) = \frac{1}{\sqrt{2\pi\sigma}} \exp\left(-\frac{|x_k - ay_k|^2}{2\sigma^2}\right), \quad (6.1)$$

wherein $x_k = ay_k + n_k$ (6.2) is satisfied, subscript k is time, a is impulse response of the communication channel, $n_k$ is noise and $\sigma$ is dispersion of noise. When a receiver is warmed by a normal temperature such as in the case of ground mobile communication, the noise applied to a signal is decided by Gaussian noise which arises from an LNA (Low Noise Amplifier) in the receiver. Therefore, the equation (6.1) can be used as probability distribution of signals passed through a normal communication channel. In the receiver, the sending signal series can be estimated by calculating conditional probability density function of the equation (4) by using probability distribution which is directly measured or probability distribution obtained by the equation (6.1), and by regarding the conditional probability density function as likelihood function for the sending signal series.

The receiver is formed by circuits realized by arithmetic units. Especially, the receiver is formed by digital circuits in recent years. Since the arithmetic unit is formed mainly by product-sum operation units, it is necessary to perform rational-function-expanding in order to handle the function of the equation (6.1). Therefore, computing amount may be increased. Thus, there is a method to calculate logarithm of the equation (6.1) for decreasing the computing amount in the receiver. In this case, the equation (4) becomes log likelihood function $J_k$ which is represented as follows.

$$J_k = \sum_{m=l}^{M} \log P(r_m(k) | r_{m+1}(k) \ldots r_N(k)d_m(k) \ldots d_m(k-L_\tau) \ldots d_K(k-L_\tau)) \quad (7.1)$$

$$= \sum_{m=l}^{M} J_{k,m}$$

$$J_{k,m} = -\frac{\left| r_k - \sum_{n=m+1}^{K} d_n(k) \right|^2}{2\sigma^2} \quad (7.2)$$

In the following, a first embodiment and a second embodiment will be described. In the first embodiment, the joint probability density function is calculated, and the sending signal series which maximizes the joint probability density function is estimated. In the second embodiment, the log likelihood function is calculated, and the sending signal series which maximizes the log likelihood function is estimated.

FIG. 1 is a first configuration example of a receiver which estimates the sending signal series which maximizes the joint probability density function according to the first embodiment. The receiver shown in FIG. 1 is in a base station in a wireless communication system for example. The receiver demodulates first to Kth (K≧2) user signals among N user signals which are transmitted on the same wireless channel. The receiver includes an input terminal 1, K stages of signal extractors 2-1–2-K, K stages of conditional probability estimators (Joint probability calculation) 3-1–3-K, a multiplier 4, a series estimator 5, and output terminals 6-1–6-K.

The input terminal 1 receives N user signals which are transmitted on the same wireless channel. Each signal extractor extracts predetermined user signals from the N user signals. More concretely, the signal extractor 2-i (ith signal extractor) extracts ith–Kth user signals.

The signal extractors 2-1–2-K can be realized by an orthogonal filter, a modified decorrelating detector and the like used for an adaptive array and CDMA communication. When using the adaptive array, desired signals can be received without receiving interference signal by directing null to the interference signal. When using the orthogonal filter, codes of predetermined signal group is output and coefficients of the filter can be decided such that codes of the other signal groups are orthogonalized. In addition, when using the modified decorrelating detector, predetermined number of user codes among all user codes are received by matched filters for users, and an inverse matrix of correlation matrix between the codes is operated on output signals of the matched filters. As a result, only finite signals are orthogonalized. Since only finite signals are orthogonalized, other signals can be received.

Each of the conditional probability estimator 3-1–3-K estimates the conditional probability density function on the basis of user signals extracted by the same stage signal extractor and user signals estimated by the series estimator 5. The conditional probability density function indicates probability that user signals extracted by the signal extractor will be obtained if the user signals estimated by the series estimator 5 are transmitted by transmitters (not shown in the figure). This probability can be obtained by the above-mentioned equation (2) or the equation (4). More concretely, the conditional probability estimator 3-i (ith conditional probability estimator) obtains probability (joint probability density function, conditional probability density function) that ith–Kth user signals extracted by the signal extractor 2-i are obtained if ith–Kth user signals (tentative decision data) estimated by the series estimator 5 are transmitted.

The multiplier 4 multiplies conditional probability density function obtained by the conditional probability estimators 3-1–3-K. The series estimator 5 estimates sending signal series of the users such that the multiplied value becomes maximum. That is, the series estimator 5 estimates sending signal series of the users such that the conditional probability density functions obtained by the conditional probability estimators 3-1–3-K become maximum.

More concretely, when the multiplied value calculated by the multiplier 4 is not the maximum value, the series estimator 5 estimates each signal series (tentative decision data) for each of first to Kth user signals and outputs the signal series to each conditional probability estimator. The conditional probability estimator calculates conditional probability density function on the basis of these signal series and user signals extracted by the same stage signal extractor. Then, the multiplier 4 multiplies the conditional probability density functions. When the multiplies value is still not maximum, the series estimator 5 estimates and outputs signal series again.

By repeating this operation, when the multiplied value calculated by the multiplier 4 becomes maximum, the series estimator 5 determine each signal series estimated just before as first–Kth user sending signal series, and outputs them to the output terminals 6-1–6-K.

Accordingly, the receiver of this embodiment extracts predetermined number of user signals from received signals, and estimates each user signal such that joint probability density function of the extracted user signals and estimated user signals becomes maximum. Therefore, degradation of transmission characteristics due to hard decision can be suppressed so that communication quality can be improved. Especially, when the receiver is applied to the base station in the wireless communication system, high quality communication becomes possible even under interference condition to some extent. Thus, closer areas which use the same frequency can be used, and efficiency of frequency use in the plane directions can be improved.

In mobile communications, transmission states vary every moment according to movement of terminals and peripheral devices. Therefore, when using a signal extraction method, such as by the adaptive array, of canceling predetermined signals depending on angle of incidence of signals, it is necessary to change parameters (weight coefficients) according to variation of the transmission states.

Figure 2:
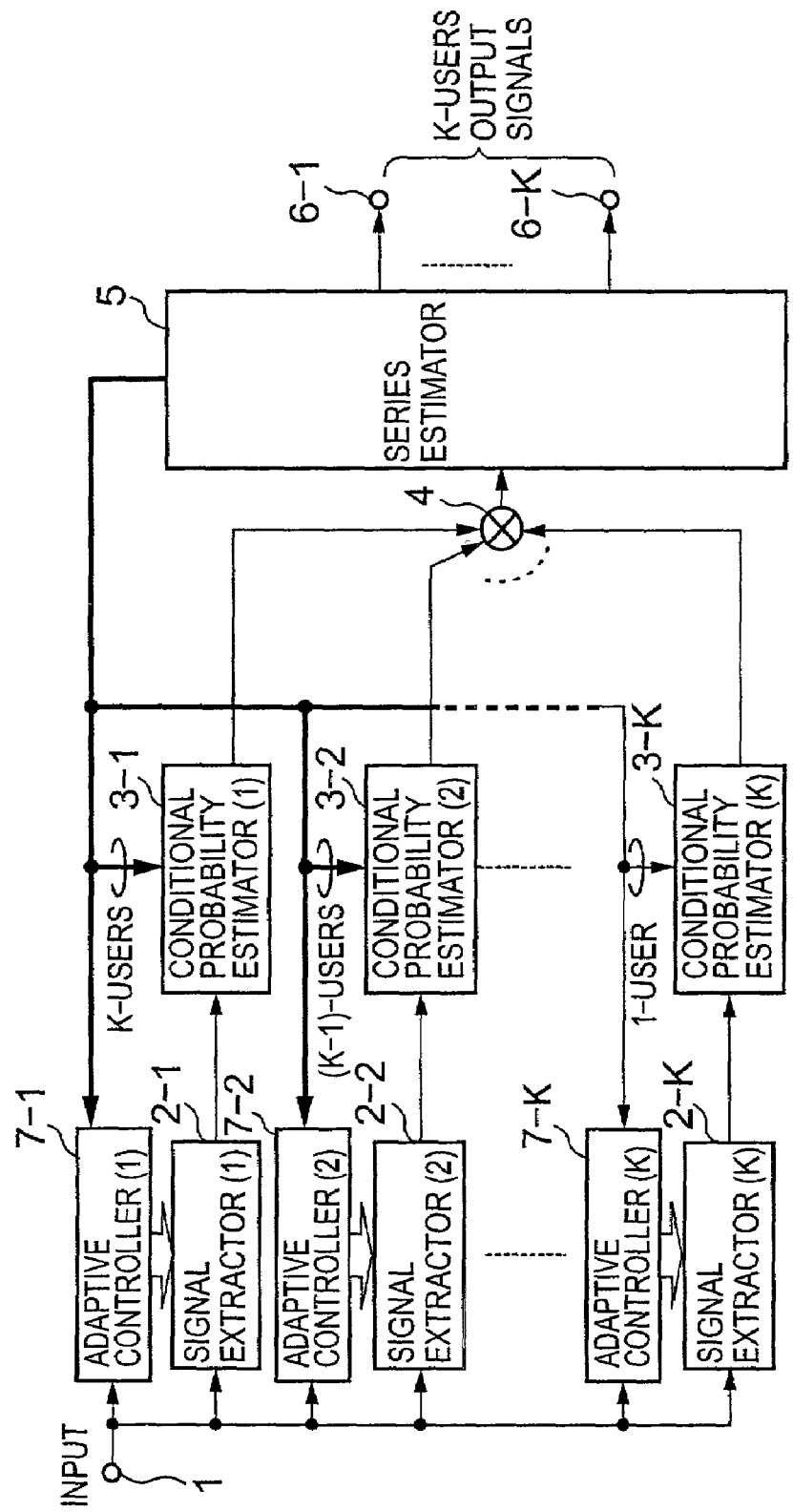
FIG. 2 shows a second configuration example of a receiver of the first embodiment.

FIG. 2 shows a second configuration example of a receiver of the first embodiment. The receiver of this example adaptively estimates coefficients of the signal extractors on the basis of received signals and signal series from the series estimator. Compared with the receiver shown in FIG. 1, K stages of adaptive controllers 7-1–7-K are provided in the receiver shown in FIG. 2. Each adaptive controller adaptively estimates parameters of the same stage signal extractor on the basis of received signals and signal series from the series estimator according to variation of the communication channel states. The signal series from the series estimator 5 may be decided signal series as user sending signal series or may be not-decided signal series. The signal extractors 2-1–2-K weight received signals by using the estimated parameters.

Figure 3:
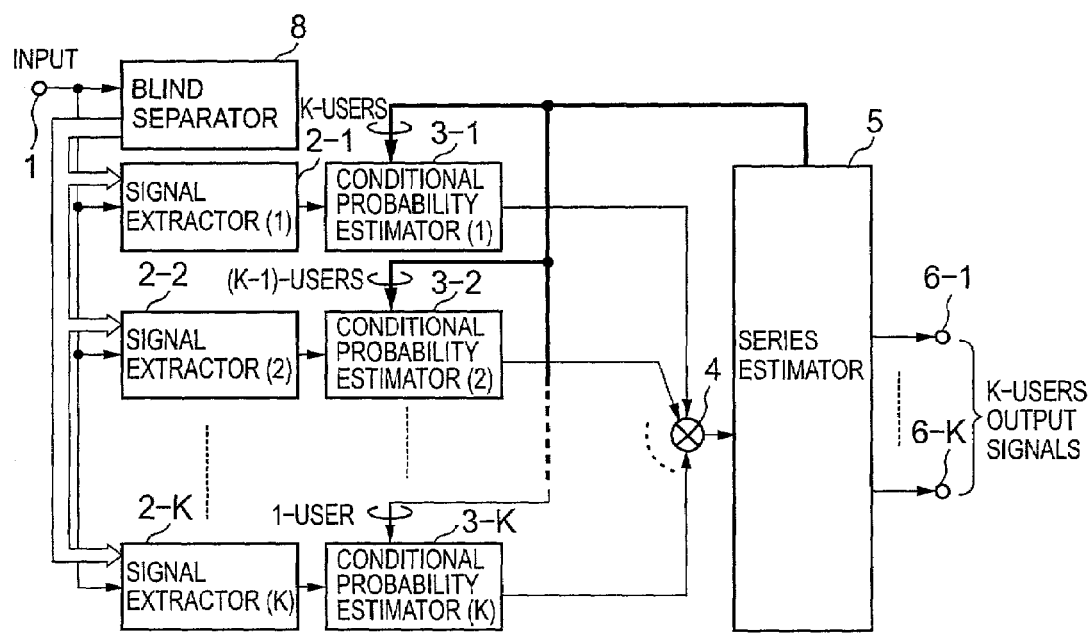
FIG. 3 shows a third configuration example of a receiver of the first embodiment.

FIG. 3 shows a third configuration example of a receiver of the first embodiment. The receiver of this example adaptively estimates coefficients of the signal extractors on the basis of only received signals. Compared with the receiver shown in FIG. 1, an adaptive controller (Blind Separator) 8 is provided in the receiver shown in FIG. 3. The adaptive controller 8 adaptively estimates parameters of the signal extractors 2-1–2-K on the basis of received signals according to variation of the communication channel states. The signal extractors 2-1–2-K weight received signals by using the estimated parameters.

In an environment in which transmission states vary every moment such as in mobile communications, received power of a signal of each user also varies. Therefore, demodulation having higher likelihood can be performed by determining which signals should be extracted from each of the signal extractors 2-1–2-K such that the conditional probability density function of the equation (4) becomes maximum. That is, communication quality can be further improved by determining user group state corresponding to signals output from the signal extractors such that the joint probability density function of the equation (1) becomes maximum.

Figure 4:
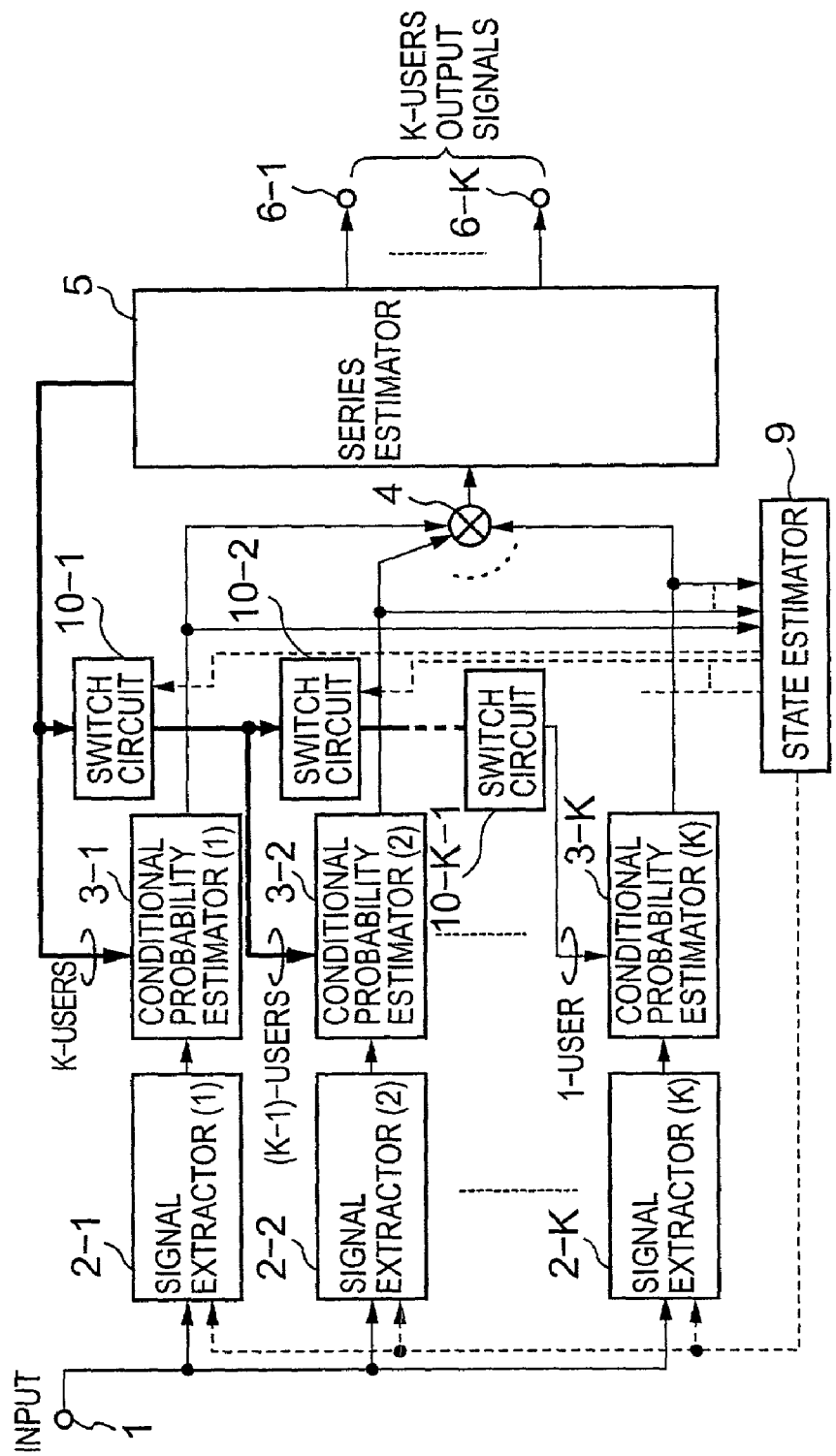
FIG. 4 shows a fourth configuration example of a receiver of the first embodiment.

FIG. 4 shows a fourth configuration example of a receiver in the first embodiment. The receiver switches user signals output from the signal extractors according to dynamic signal variation. Compared with the receiver shown in FIG. 1, a state estimator 9 and switch circuits 10-1–10-K–1 are provided in the receiver of FIG. 4. The state estimator 9 determines which user signals are to be extracted from the signal extractors 2-1–2-K such that the conditional probability density function obtained by the conditional probability estimators 3-1–3-K becomes maximum every predetermined time or every time when discrete communication such as packet communication starts. The signal extractors 2-1–2-K outputs predetermined user signals according to this determination. The switch circuits 10-1–10-K–1 switch output signals such that signals input to the conditional probability estimators 3-1–3-K from the signal extractors 2-1–2-K and signal series input to the conditional probability estimators 3-1–3-K from the series estimator 5 have the same user group. For example, the switch circuit 10-1 switch output signals such that signals input to the conditional probability estimator 3-2 from the signal extractor 2-2 and signal series input to the conditional probability estimator 3-2 from the series estimator 5 have the same user group.

Figure 5:
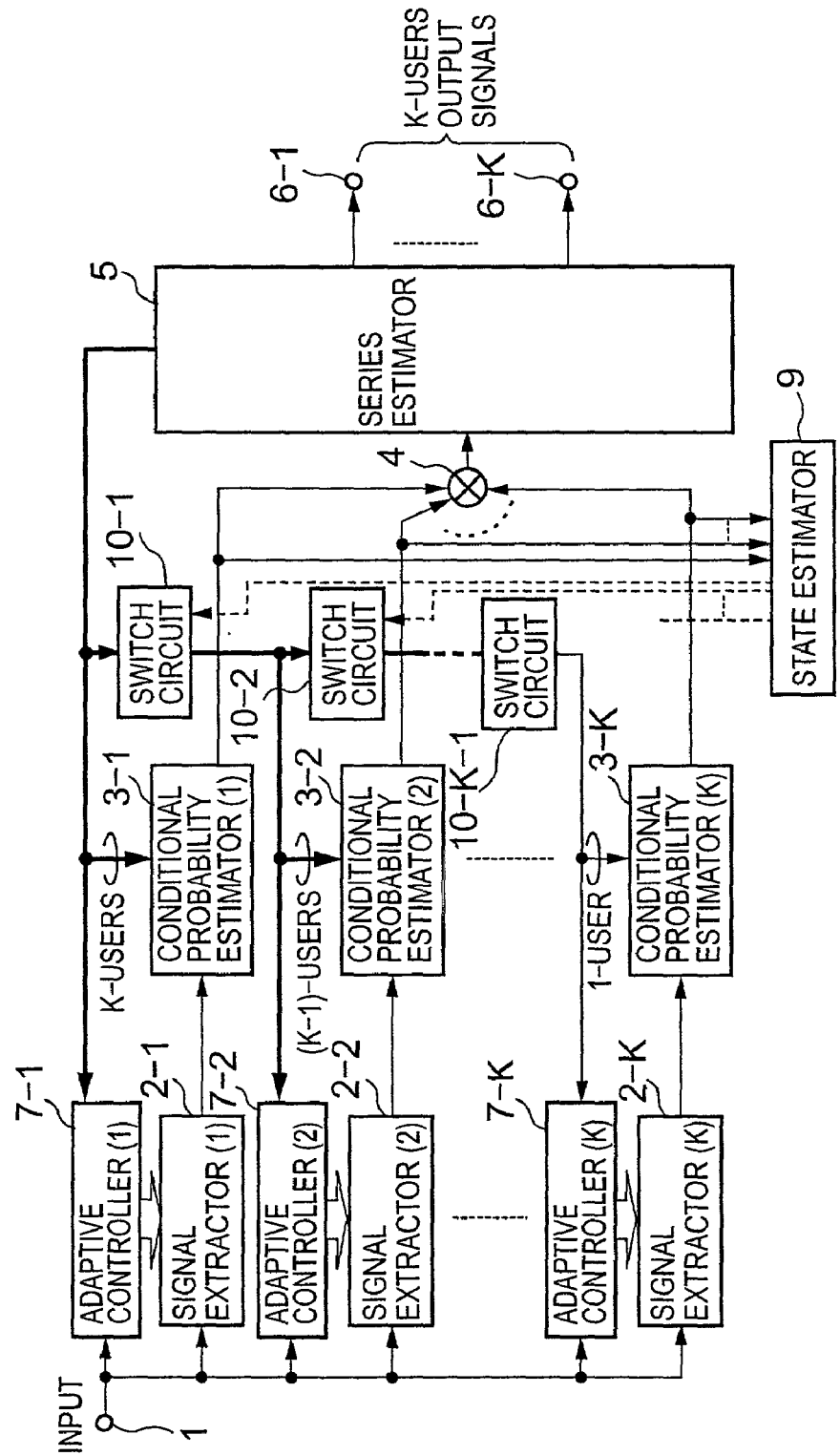
FIG. 5 shows a fifth configuration example of a receiver of the first embodiment.

The signal extractors may switch output user signals in addition to adaptively estimating coefficients of the signal extractors. FIG. 5 shows a fifth configuration example of the receiver of the first embodiment. The receiver adaptively estimates coefficients of the signal extractors on the basis of received signals and signal series from the series estimator, and user signals output from the signal extractors are switched. Compared with the receiver shown in FIG. 1, K stages of adaptive controllers 7-1–7-K, a state estimator 9 and switch circuits 10-1–10-K–1 are provided to the receiver shown in FIG. 5. The operations of the adaptive controllers 7-1–7-K, the state estimator 9 and switch circuits 10-1–10-K–1 are the same as those of FIG. 2 and FIG. 4.

Figure 6:
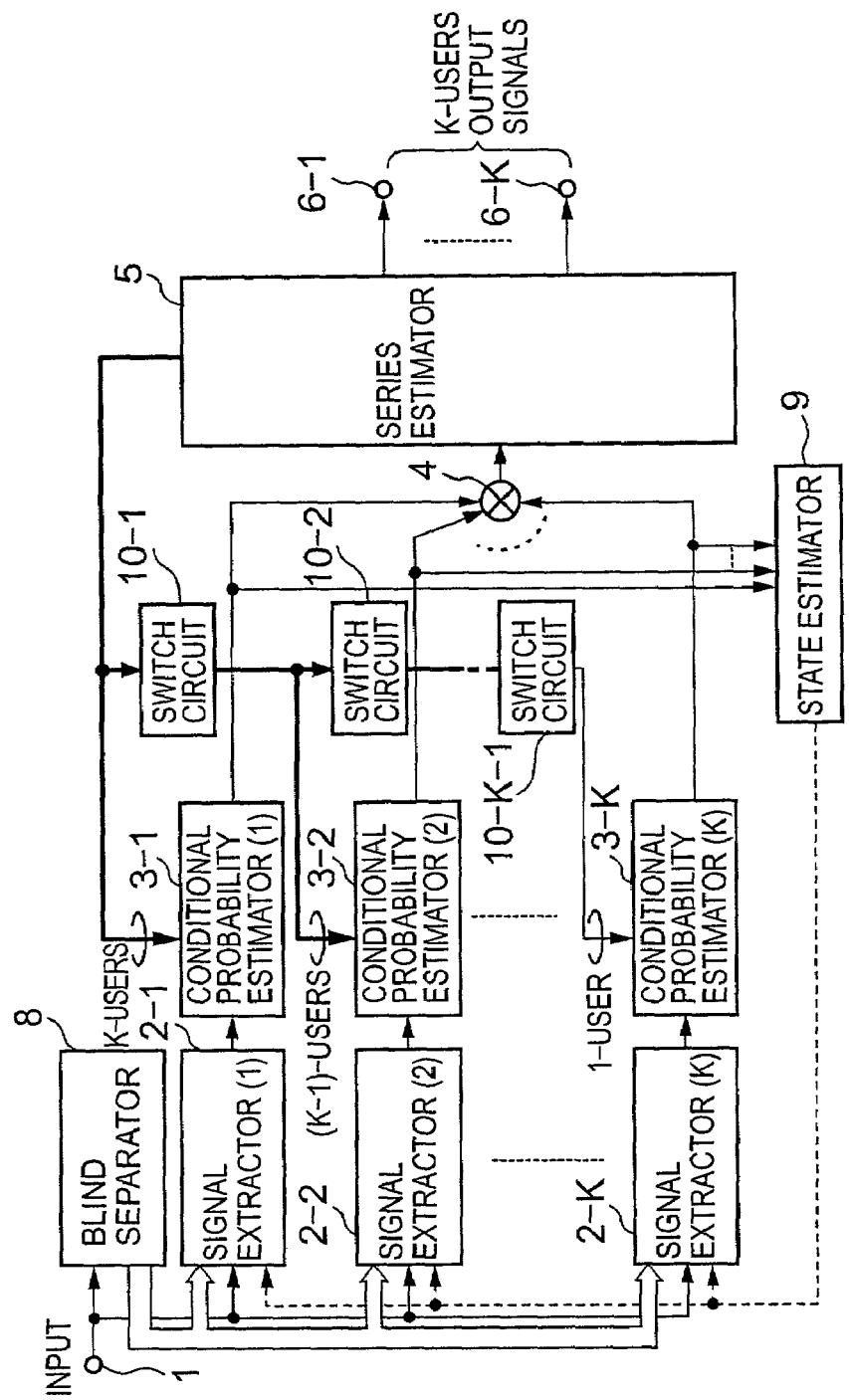
FIG. 6 shows a sixth configuration example of a receiver of the first embodiment.

FIG. 6 shows a sixth configuration example of the receiver of the first embodiment. The receiver adaptively estimates coefficients of the signal extractors on the basis of only received signals, and user signals output from the signal extractors are switched. Compared with the receiver shown in FIG. 1, an adaptive controller (Blind Separator) 8, a state estimator 9 and switch circuits 10-1–10-K–1 are provided to the receiver shown in FIG. 5. The operations of the adaptive controller 8, a state estimator 9 and switch circuits 10-1–10-K–1 are the same as those of FIG. 3 and FIG. 4.

Figure 7:
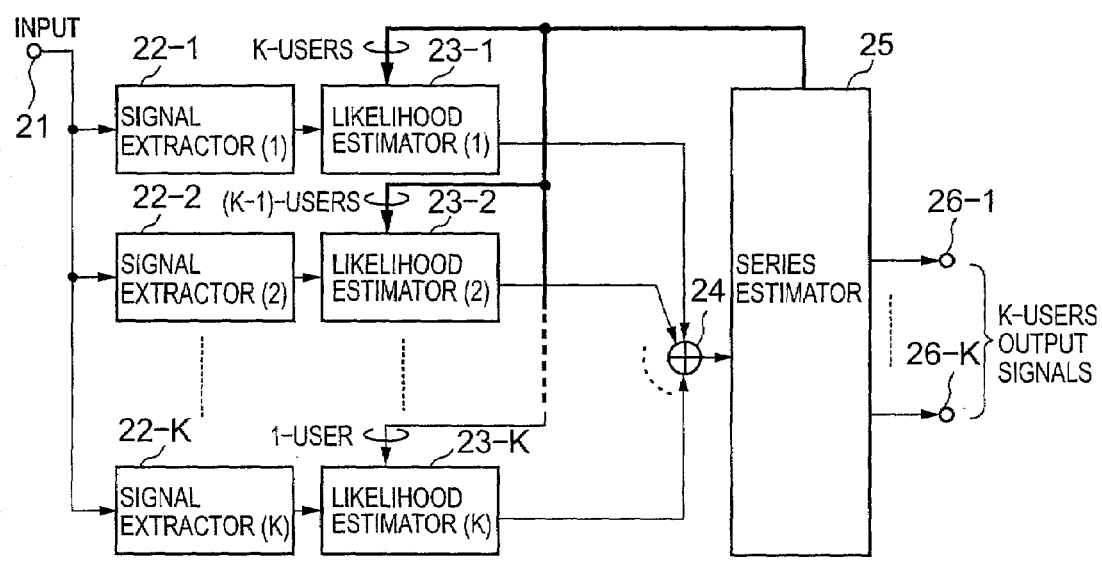
FIG. 7 shows a first configuration example of a receiver which estimates the sending signal series which maximizes log likelihood function according to a second embodiment.

Next, the second embodiment will be described in which log likelihood function is calculated and sending signal series which maximizes the log likelihood function is estimated. FIG. 7 shows a first configuration example of a receiver which estimates the sending signal series which maximizes the log likelihood function according to the second embodiment. Like the receiver in the first embodiment, the receiver is in a base station in a wireless communication system for example. The receiver demodulates first to Kth (K≧2) user signals among N user signals transmitted on the same wireless channels. The receiver includes an input terminal 21, K stages of signal extractors 22-1–22-K, K stages of likelihood estimators (metric generator) 23-1–23-K, an adder 24, a series estimator 25 and output terminals 26-1–26-K.

N user signals transmitted on the same wireless channel are input to the input terminal 21. Like the signal extractors in the first embodiment, the signal extractors 22-1–22-K extract only predetermined user signals from the N user signals input to the input terminal 21.

Each likelihood estimator calculates logarithm of conditional probability density function (log likelihood function) on the basis of user signals extracted by the same stage signal extractor and user signals estimated by the series estimator 25.

The adder 24 adds the log likelihood functions obtained by the likelihood estimators 23-1–23-K. The series estimator 25 estimates sending signal series for each user such that the added value becomes maximum, that is, such that, the log likelihood functions obtained by the likelihood estimators 23-1–23-K become maximum.

More concretely, like the series estimator in the first embodiment, when the added value calculated by the adder 24 is not the maximum value, the series estimator 25 estimates each signal series for each of first to Kth user signals and outputs the signal series to each likelihood estimator. The likelihood estimator calculates log likelihood function on the basis of this signal series and user signals extracted by the same stage signal extractor. Then, the adder 24 adds the log likelihood functions. When the added value is still not maximum, the series estimator 25 estimates and outputs signal series to the likelihood estimators again.

By repeating this operation, when the added value calculated by the adder 24 becomes maximum, the series estimator 25 determine each signal series estimated just before as first–Kth user sending signal series, and outputs the signals to the output terminals 26-1–26-K.

Accordingly, the receiver of this embodiment extracts predetermined number of user signals from received signals, and estimates each user signal such that logarithm of joint probability density function of the extracted user signals and estimated user signals becomes maximum. Therefore, degradation of transmission characteristics due to hard decision can be suppressed so that communication quality can be improved. In addition, since the logarithm is calculated instead of using the joint probability density function as-is, computing amount can be decreased. In addition, like the receiver in the first embodiment, when the receiver is applied to the base station in the wireless communication system, high quality communication becomes possible even under interference condition to some extent. Thus, closer areas which use the same frequency can be used, and efficiency of frequency use in the plane directions can be improved.

Like the first embodiment, when using a signal extraction method, such as a method by using adaptive array, of canceling predetermined signals depending on angle of incidence of signals, it is necessary to change parameters (weight coefficients) according to variation of the transmission states.

Figure 8:
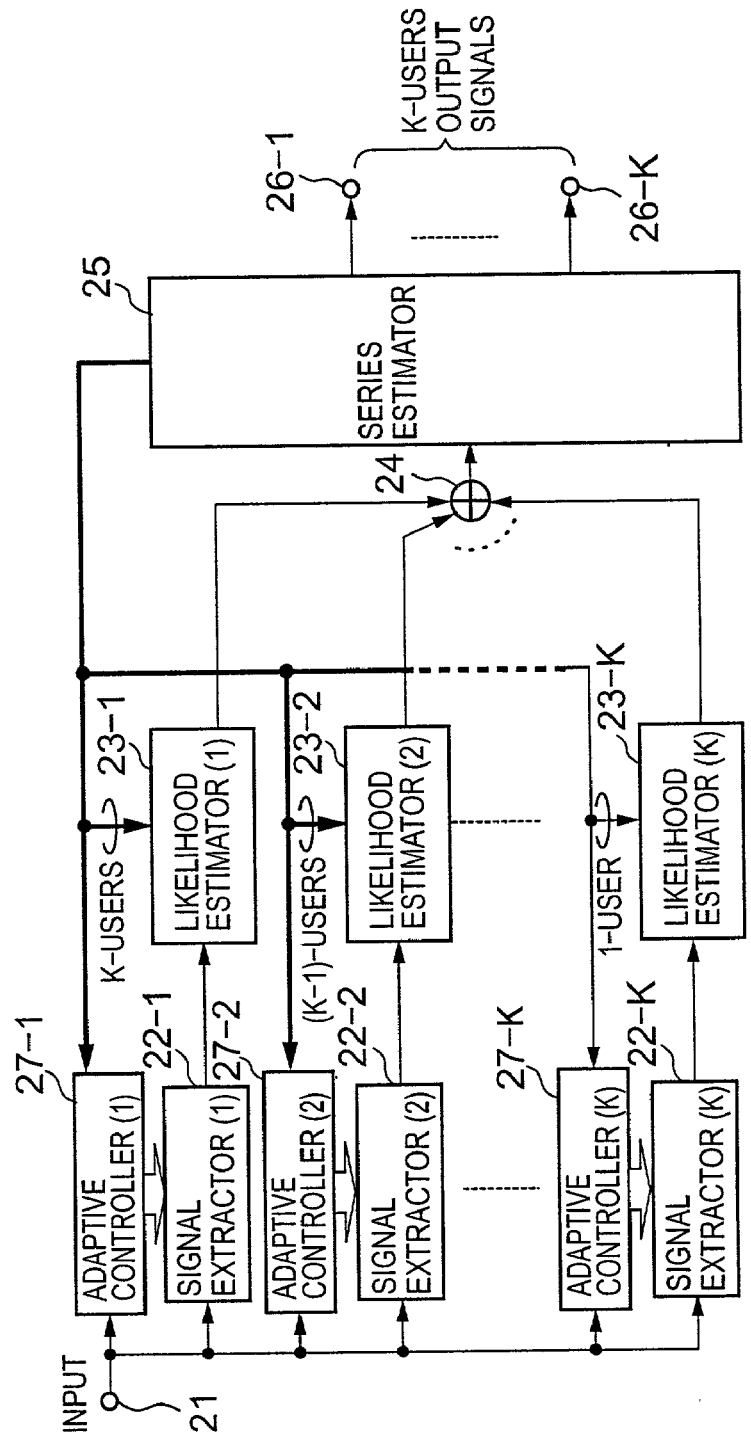
FIG. 8 shows a second configuration example of a receiver of the second embodiment.

FIG. 8 shows a second configuration example of a receiver of the second embodiment. The receiver of this example adaptively estimates coefficients of the signal extractors on the basis of received signals and signal series from the series estimator. Compared with the receiver shown in FIG. 7, K stages of adaptive controllers 27-1–27-K are provided in the receiver shown in FIG. 8. Each adaptive controller adaptively estimates parameters of the same stage signal extractor on the basis of received signals and signal series from the series estimator 25 according to variation of the communication channel states, like the adaptive controllers 7-1–7-K of the first embodiment. The signal series from the series estimator 25 may be decided signal series as user sending signal series or may be not-decided signal series. The signal extractors 22-1–22-K weight received signals by using the estimated parameters.

Figure 9:
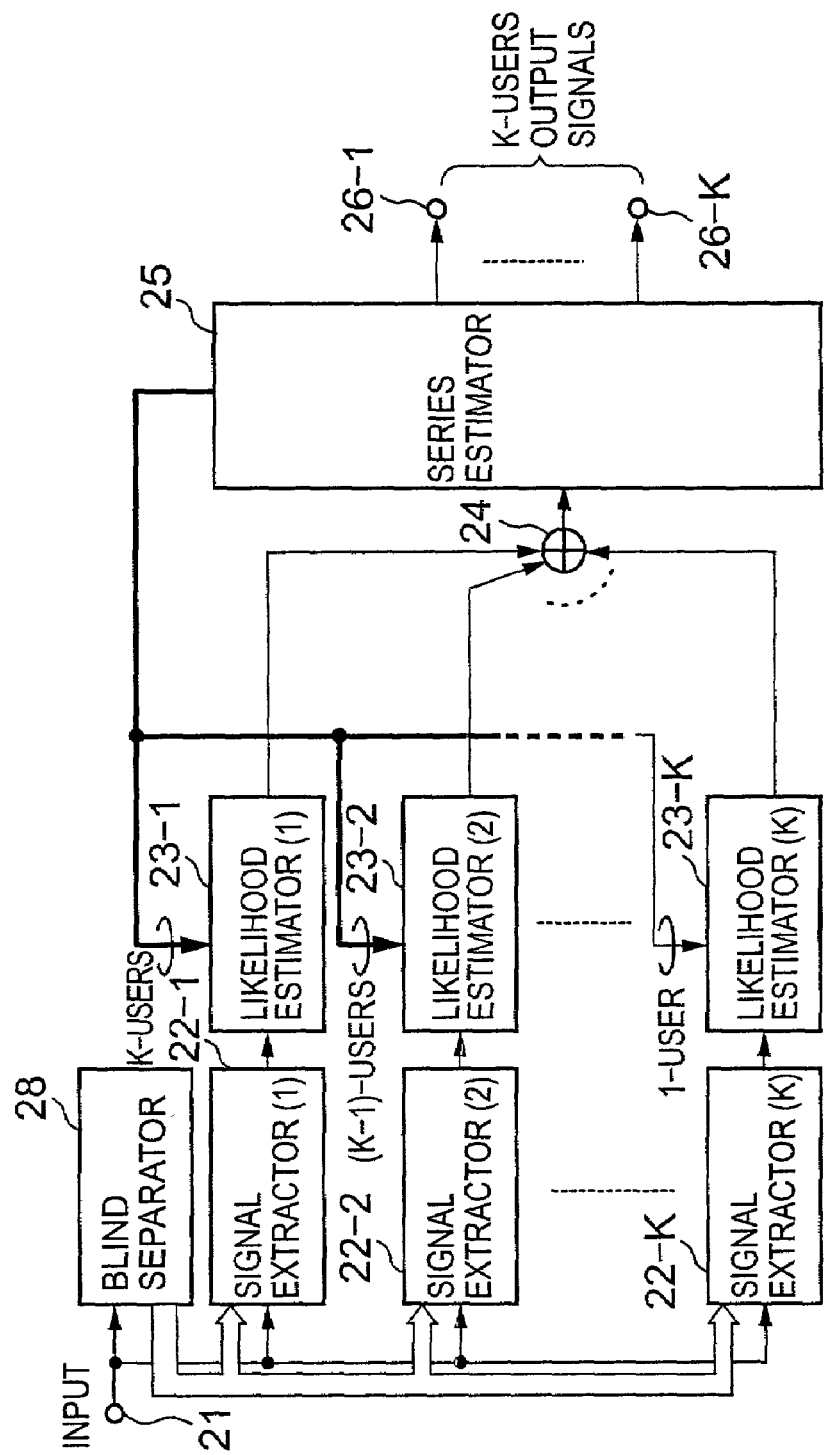
FIG. 9 shows a third configuration example of a receiver of the second embodiment.

FIG. 9 shows a third configuration example of a receiver of the second embodiment. The receiver of this example adaptively estimates coefficients of the signal extractors on the basis of only received signals. Compared with the receiver shown in FIG. 7, an adaptive controller (Blind Separator) 28 is provided in the receiver shown in FIG. 9. Like the adaptive controller 8 of the first embodiment, the adaptive controller 28 adaptively estimates parameters of the signal extractors 22-1–22-K on the basis of received signals according to variation of the communication channel states. The signal extractors 22-1–22-K weight received signals by using the estimated parameters.

Like the first embodiment, in an environment in which transmission states vary every moment, received power of a signal of each user also varies. Therefore, communication quality can be further improved by determining which signals should be extracted from the signal extractors 22-1–22-K such that the log likelihood function of the equation (4) becomes maximum. That is, communication quality can be further improved by determining user group state corresponding to signals output from the signal extractors such that the joint probability density function of the equation (1) becomes maximum.

Figure 10:
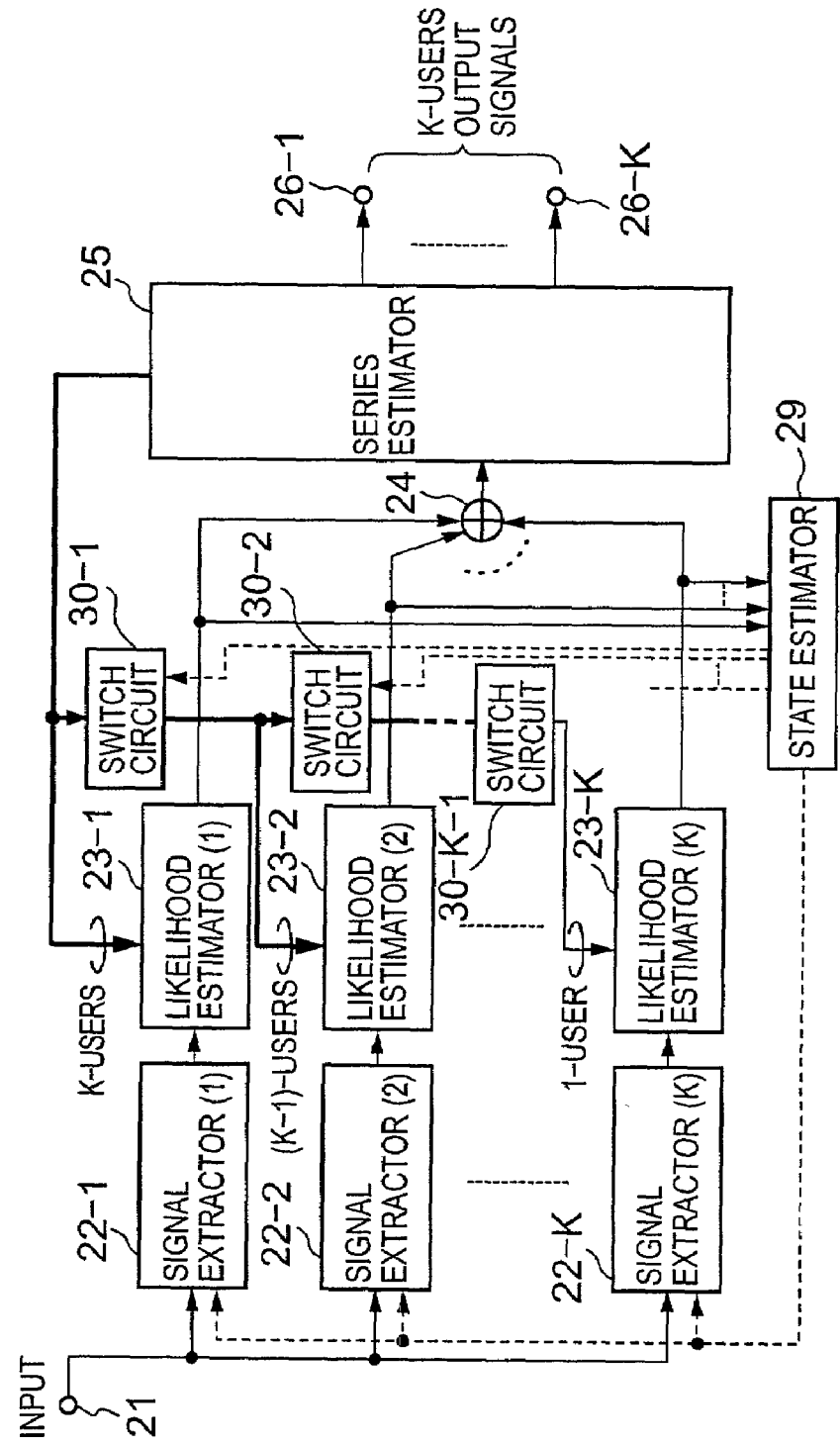
FIG. 10 shows a fourth configuration example of a receiver of the second embodiment.

FIG. 10 shows a fourth configuration example of a receiver in the second embodiment. The receiver switches user signals output from the signal extractors according to dynamic signal variation. Compared with the receiver shown in FIG. 7, a state estimator 29 and switch circuits 30-1–30-K–1 are provided in the receiver of FIG. 10. Like the state estimator 9 in the first embodiment, the state estimator 29 determines which user signals are to be extracted from the signal extractors 22-1–22-K such that the log likelihood functions obtained by the likelihood estimators 23-1–23-K becomes maximum every predetermined time or every time when discrete communication such as packet communication starts. The signal extractors 22-1–22-K outputs predetermined user signals according to this determination. Like the switch circuits 10-1–10-K–1 in the first embodiment, the switch circuits 30-1–30-K–1 switch output signals such that signals input to the likelihood estimators 23-1–23-K from the signal extractors 22-1–22-K and signal series input to the likelihood estimators 23-1–23-K from the series estimator 25 have the same user group.

Figure 11:
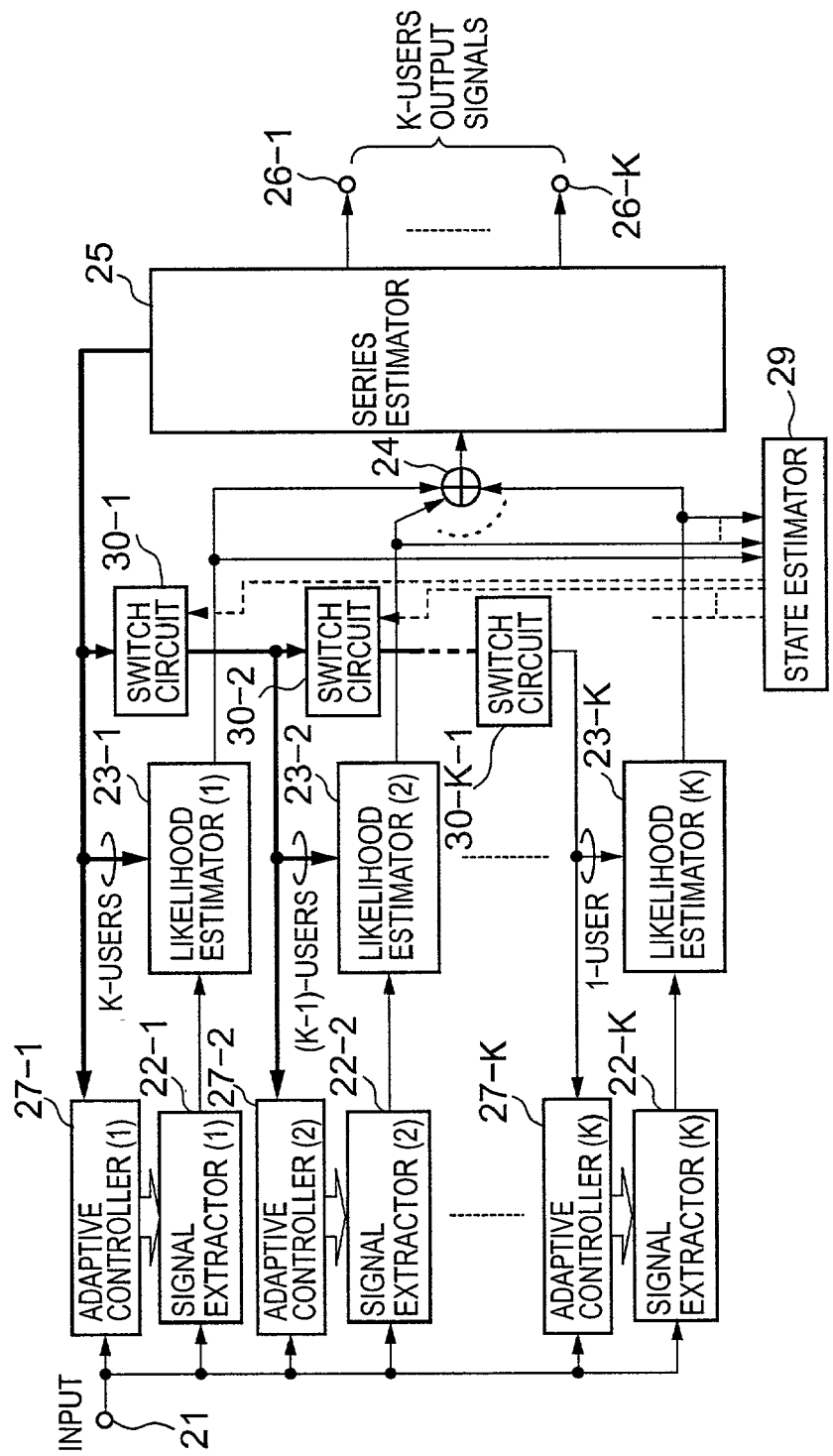
FIG. 11 shows a fifth configuration example of a receiver of the second embodiment.

User signals output from the signal extractors may be switched in addition to adaptively estimating coefficients of the signal extractors. FIG. 11 shows a fifth configuration example of the receiver of the second embodiment. The receiver adaptively estimates coefficients of the signal extractors on the basis of received signals and signal series from the series estimator, and user signals output from the signal extractors are switched. Compared with the receiver shown in FIG. 7, K stages of adaptive controller 27-1–27-K, a state estimator 29 and switch circuits 30-1–30-K–1 are provided in the receiver shown in FIG. 11. The operations of the adaptive controller 27-1–27-K, a state estimator 29 and switch circuits 30-1–30-K–1 are the same as those of FIG. 9 and FIG. 10.

Figure 12:
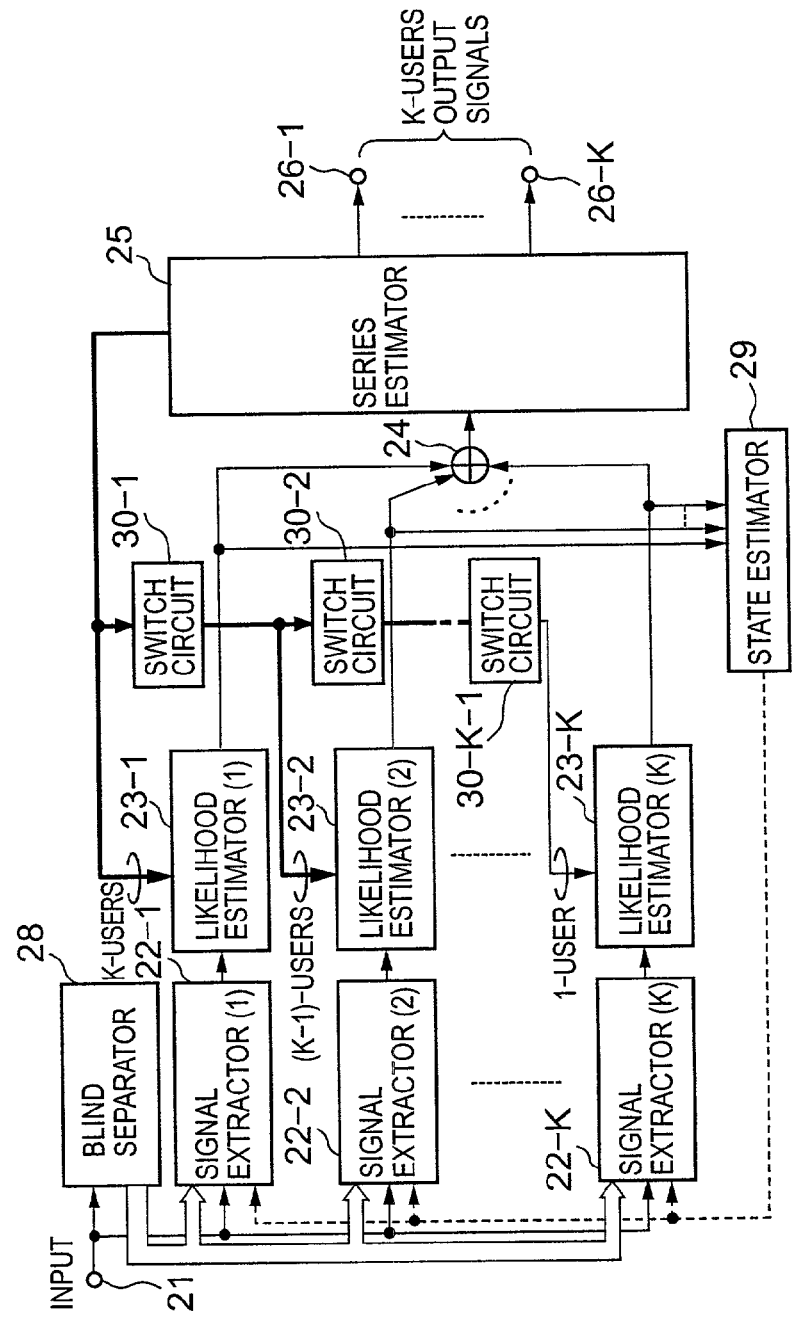
FIG. 12 shows a sixth configuration example of a receiver of the second embodiment.

FIG. 12 shows a sixth configuration example of the receiver of the second embodiment. The receiver adaptively estimates coefficients of the signal extractors on the basis of only received signals, and user signals output from the signal extractors are switched. Compared with the receiver shown in FIG. 7, an adaptive controller (Blind Separator) 28, a state estimator 29 and switch circuits 30-1–30-K–1 are provided in the receiver shown in FIG. 12. The operations of the adaptive controller 28, a state estimator 29 and switch circuits 30-1–30-K–1 are the same as those of FIG. 9 and FIG. 10.

Next, each function block included in the receiver of the first and second embodiments will be described.

Figure 13:
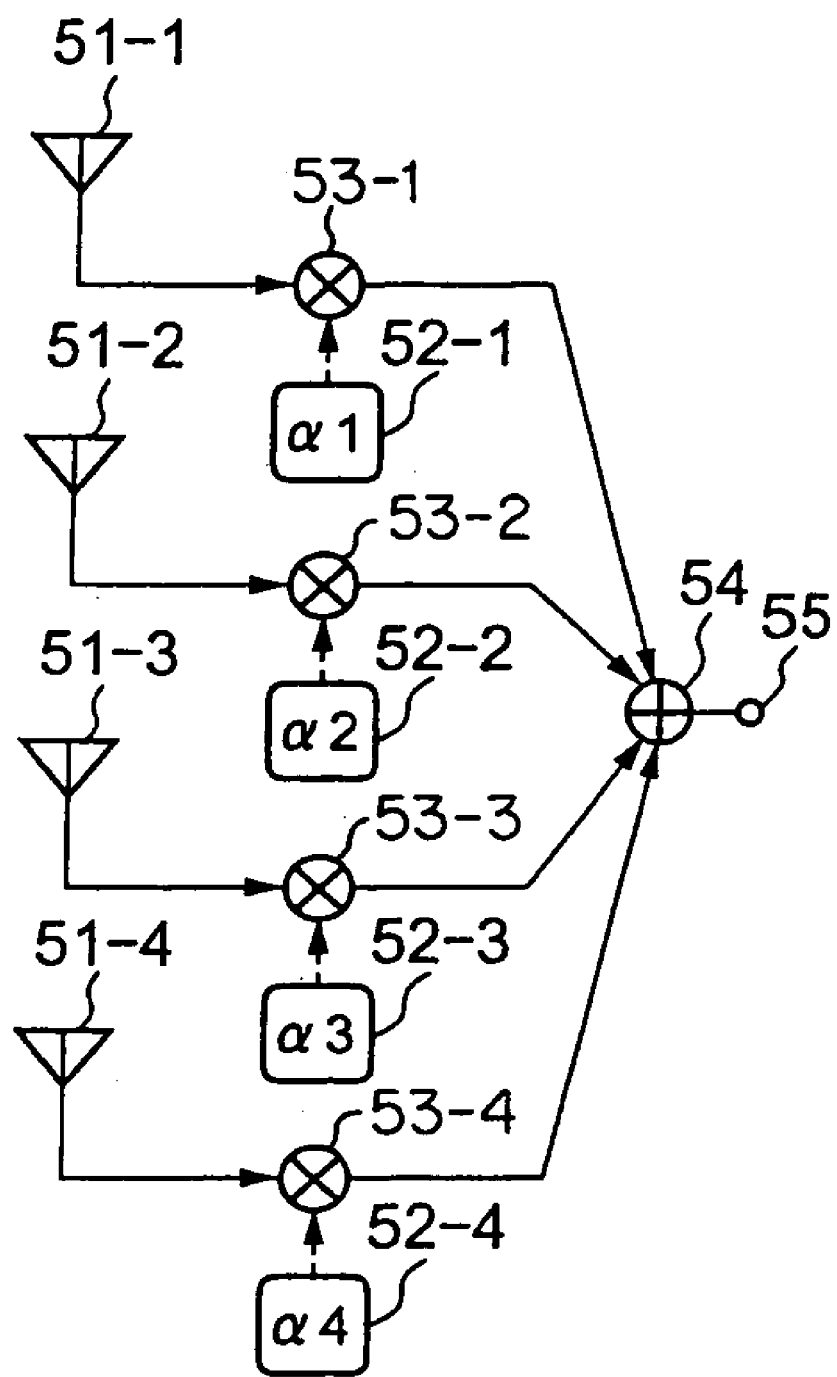
FIG. 13 shows a first configuration example of a signal extractor.

FIG. 13 shows a first configuration example of the signal extractor. The signal extractor shown in the figure is a configuration in the case of using four element phased array antennas. The signal extractor includes feeding points 51-1–51-4 of the array antennas, coefficient memory elements 52-1–52-4, multipliers 53-1–53-4, an adder 54 and an output terminal 55. Since this signal extractor have the same configuration as that of a normal field array, this signal extractor operates such that only signals of a predetermined direction are received and signals of other directions are canceled.

Figure 14:
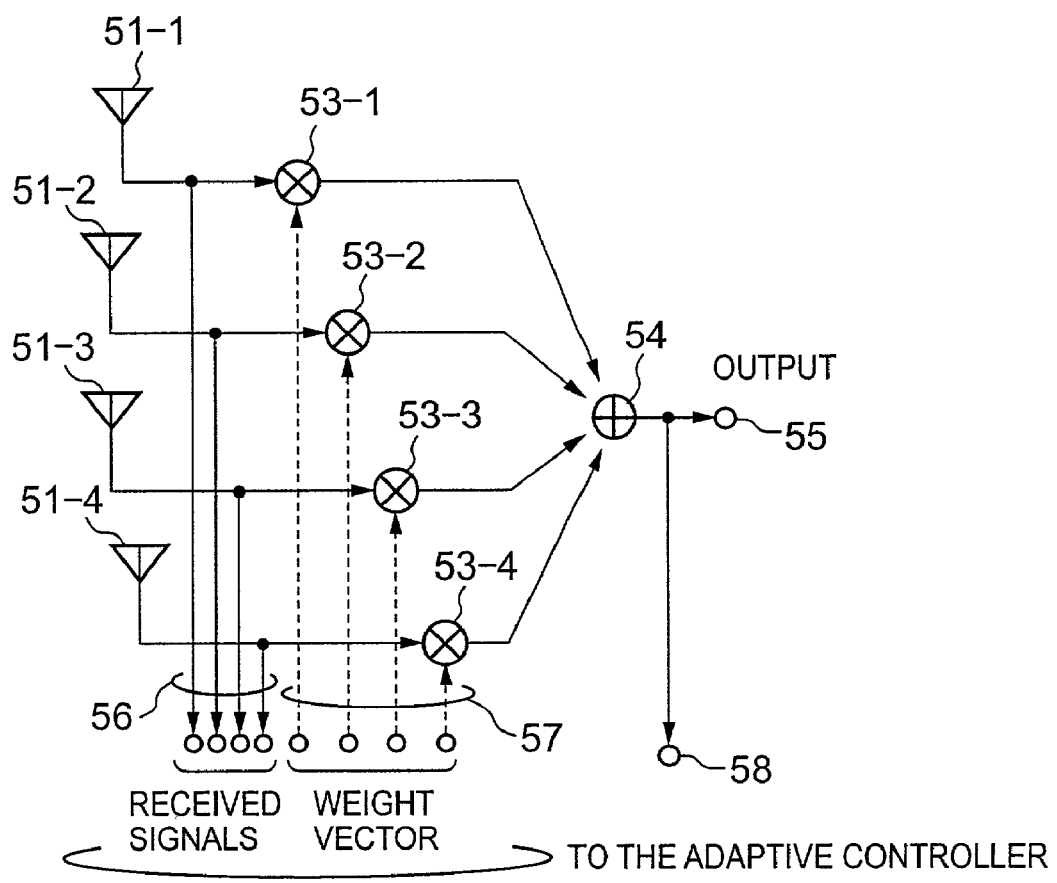
FIG. 14 shows a second configuration example of the signal extractor.

FIG. 14 shows a second configuration example of the signal extractor in the case of estimating coefficients adaptively. Like the signal extractor shown in FIG. 13, the signal extractor shown in FIG. 14 is a configuration in the case of using four element phased array antennas. The signal extractor includes feeding points 51-1–51-4 of array antennas, multipliers 53-1–53-4, an adder 54, an output terminal 55, input signal output terminals 56, coefficient input terminals 57, and an output terminal 58 to the adaptive controller. The input signal (received signal) is output to the adaptive controller from the input signal output terminal 56. Weight coefficients from the adaptive controller are input from the coefficient input terminal 57. The signal extractor performs adaptive beam forming by using the weight coefficients and outputs signals.

Figure 15:
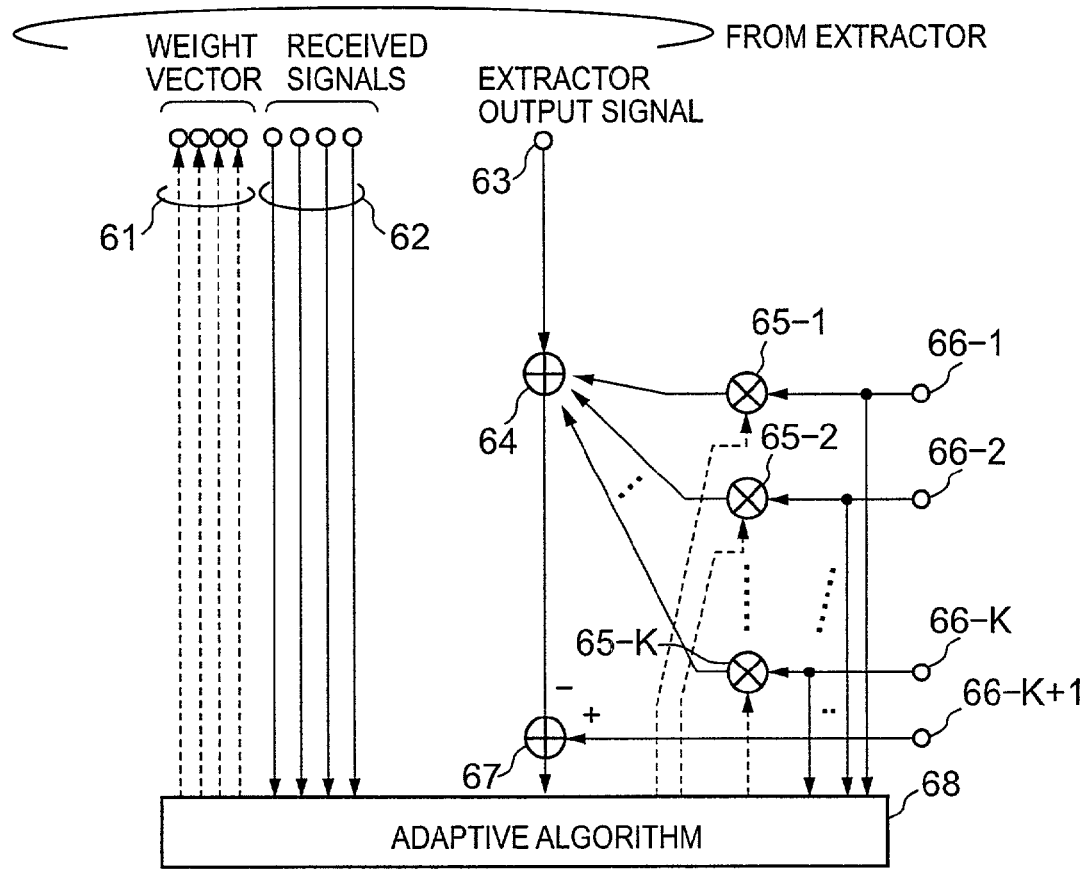
FIG. 15 is a first configuration example of an adaptive controller.

FIG. 15 is a first configuration example of the adaptive controller which uses the signal extractor shown in FIG. 14. The adaptive controller includes weight coefficient output terminals 61, signal input terminals 62, a signal extractor output signal input terminal 63, an adder 64, multipliers 65-1–65-K, input terminals 66-1–66-K+1 for tentative decision data from the series estimator, a subtractor 67, and an adaptive algorithm part 68. The adaptive controller generates replicas of output signals of the signal extractor by assigning weight to tentative decision data from the series estimator and adding them. Then, the adaptive controller controls weight coefficients by the adaptive algorithm part 68 such that mean value of difference power between the replicas and output signals of the signal extractors becomes minimum. Accordingly, the weight coefficients are controlled such that the deference between the replica and the output signal of the signal extractor becomes minimum. Therefore, only signals on the tentative decision data input terminals 66-1–66-K+1 are output from the signal extractor.

At this time, an algorithm based on MMSE (Minimum Mean Square Error) standard and the like is applied for the adaptive algorithm part 68. In the following, a case in which LMS (Least Mean Square) which is an representative algorithm based on the MMSE standard is applied will be described.

When assuming that a received signal of the feeding element of the array antenna is $u_i(k)$ (i is a number corresponding to a feeding element), and an output signal of the signal extractor is $r_k$, $r_i(k) = j=1\ N_{el} v^*_{i,j}(k) u_j(k)$ (8) is satisfied, wherein $v_{i,j}(k)$ represents the weight coefficient for multipliers in the signal extractor, N.sub.el represents the number of antenna elements. At this time, when $d_i(k)$ is tentative decision data from the tentative decision data input terminal 66–K+1, the difference between the replica and the output signal of the signal extractor can be represented as follows.

$$e_i(k) = d_i(k) - y_i(k) - \sum_{j=i+1}^{K} w^*_{i,j}(k) d_j(k), \quad (9)$$

wherein $d_i(k)$ is the tentative decision data of an ith user at time k. At this time, the weight coefficients are updated by the following equation (10).

$$\begin{pmatrix} \vdots \\ v_{i,j}(k) \\ \vdots \\ w_{i,j}(k) \\ \vdots \end{pmatrix} = \begin{pmatrix} \vdots \\ v_{i,j}(k-1) \\ \vdots \\ w_{i,j}(k-1) \\ \vdots \end{pmatrix} + \mu e^*_i(k) \begin{pmatrix} \vdots \\ u_1(k) \\ \vdots \\ d_1(k) \\ \vdots \end{pmatrix} \quad (10)$$

$$i = 1, \ldots K, \ i \langle l \langle K,$$

wherein * indicates complex conjugate and $\mu$ indicates a constant of $0 < \mu < 1$ called a step size parameter.

In addition, as an configuration example of the adaptive controller of a blind type which is used in the receiver shown in FIG. 3 and FIG. 9, there is one applying an ultra-resolution arriving direction estimation method. In the following, MUSIC method which is a representative ultra-resolution arriving direction estimation method will be described. In the MUSIC method, a correlation matrix R of input signal vector of the array antenna is obtained, and, then, eigenvalue resolution is performed for the mean value as shown in the equations (11) and (12).

$$R = E[U_k U_k^H] = E\left[\begin{pmatrix} \vdots \\ u_i(k) \\ \vdots \end{pmatrix} (\ldots\ u^*_i(k)\ \ldots)\right], \quad (11)$$

$$R = U\Gamma U^H \Gamma = \mathrm{diag}(\lambda_1 \lambda_2 \ldots \lambda_{el}) \quad (12),$$

wherein U is an unitary matrix, diag( . . . ) represents a diagonal matrix having parenthesized vectors as diagonal elements and a value $\lambda_i$ in the parenthesis represents an eigenvalue of the correlation matrix. When the number of elements of the antenna is smaller than the number K of users, following relationship is satisfied.

$$\lambda_1 > \ldots > \lambda_K \gg \lambda_{K+1} > \lambda_{el} \quad (13)$$

When assuming that eigenvector corresponding to each eigenvalue $\lambda_i$ is $u_i$, each weight coefficient can be set as $$v_i = \sum_{j=i}^{K} u_i. \quad (14)$$

Figure 16:
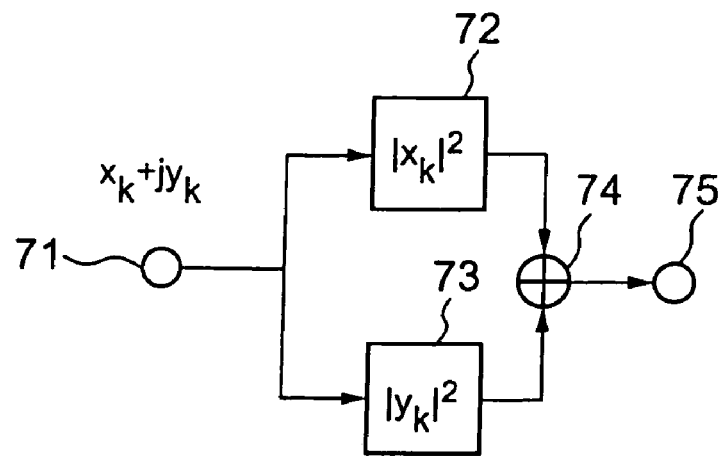
FIG. 16 shows a configuration example of a likelihood estimator.

FIG. 16 shows a configuration example of the likelihood estimator. The likelihood estimator shown in the figure includes an input terminal 71, an arithmetic circuit 72 for calculating square value of a real part, an arithmetic circuit 73 for calculating square value of an imaginary part, an adder 74 and a scalar output terminal 75. Generally, in a communication system, since a received signal is represented by equalization low band system, each signal can be represented by a complex number. Therefore, the likelihood estimator calculates the square value of an envelope of the complex number.

Figure 17:
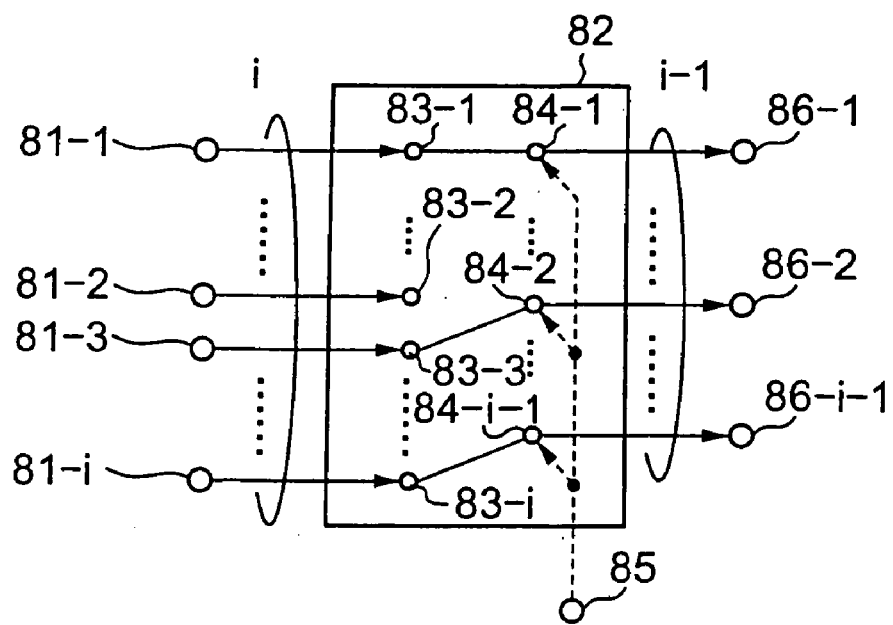
FIG. 17 shows a configuration example of a switch circuit.

FIG. 17 shows a configuration example of the switch circuit. The switch circuit shown in the figure outputs i-1 signals for i input signals. The switch circuit includes input terminals 81-1–81-i, a body 82 of the switch circuit, nodes 83-1–83-i, 84-1–84-i-1, a switch control terminal 85, and output terminals 86-1–86-i-1. In the example shown in FIG. 17, a signal from the input terminal 81-2 is disconnected and other signals are output.

When assuming that $s_k(m) = [d_i(k), \ldots, d_j(k)]$ represents a user vector state at time k, the state estimator which controls the switch circuit in FIG. 17 estimates m defined in a following equation (15).

$$\log \frac{P(s_k(m), r_1(k) \cdots r_K(k))}{P(s_k(m'), r_1(k) \cdots r_K(k))} \geq 0 \text{ for } \forall m' \in R^{K!} \quad (15)$$

Since $s_k(m)$ is generated by permuting K user data, m can take any of values the number of which is $$m = K! = \prod_{i=1}^{K} i. \quad (16)$$

P(.) is defined by the equation (1), and represents the output signal of the multiplier 4 shown in FIG. 1. At this time, the switch circuit shown in FIG. 17 allows only the top i-1 user vectors among i input user vectors to pass through. Which user vector in the i–1 user vectors in the user vectors $s_k(m)$ corresponds to which user depends on m.

Figure 18:
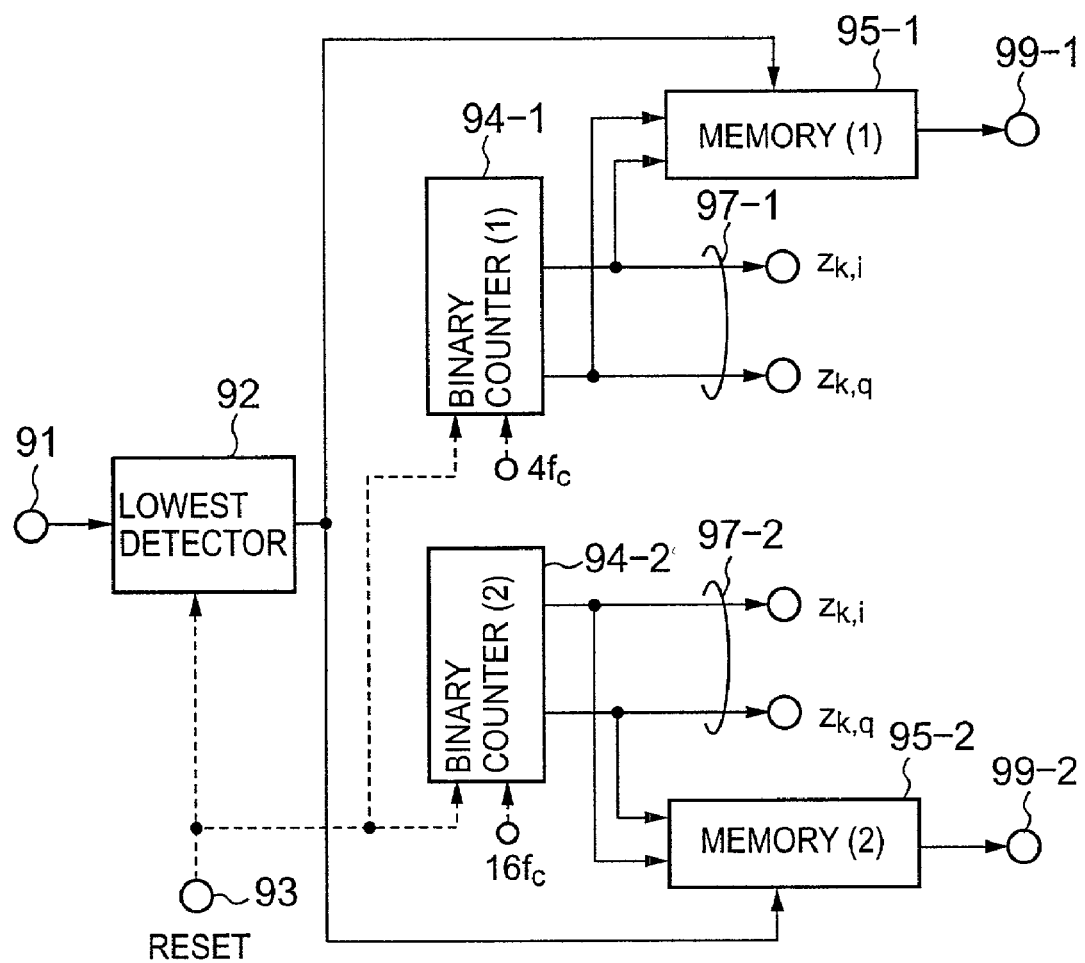
FIG. 18 shows a first configuration example of a signal estimator.

FIG. 18 shows a first configuration example of the series estimator. The series estimator shown in the figure is an example for two users each of which users uses Quadrature Phase Shift Keying (QPSK), and this example is for the case that there is no memory in the communication channel. The series estimator includes an input terminal 91, a lowest value detector 92, a reset terminal 93, binary counters 94-1, 94-2, memory circuits 95-1, 95-2, tentative decision data output terminals 97-1, 97-2 and demodulated signal output terminals 99-1, 99-2. The lowest value detector 92 and the binary counters 94-1, 94-2 are reset in synchronization with a reset signal from the reset terminal 93 in a symbol period. Therefore, the lowest value detector 92 detects a minimum value in a symbol. Since $f_c$ in FIG. 18 represents a symbol frequency, the two binary counters 94-1 and 94-2 generates every pattern of QPSK. Therefore, the lowest value detector 92 estimates the lowest combination in every signal pattern to be transmitted by the two users, extracts the combination from the memory circuits 95-1 and 95-2, and outputs the combination from the demodulated signal output terminals 99-1 and 99-2.

Figure 19:
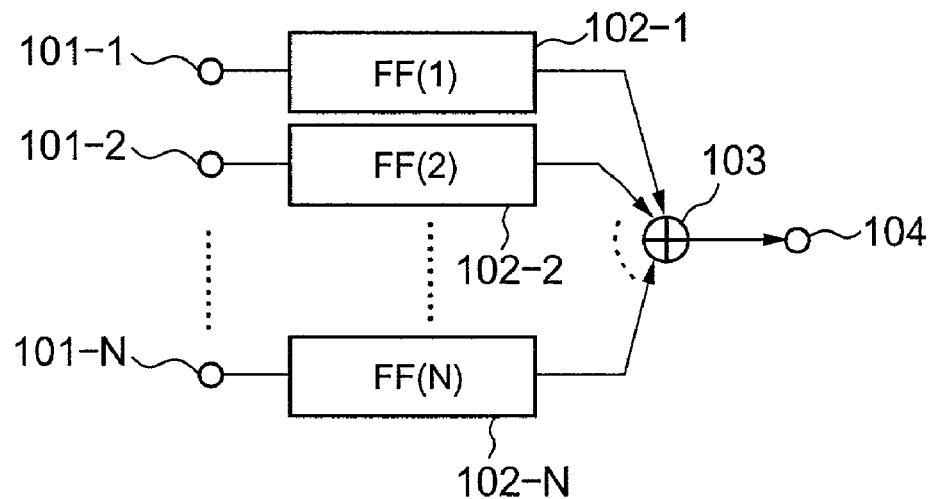
FIG. 19 shows a third configuration example of the signal extractor.

FIG. 19 shows a third configuration example of the signal extractor. The signal extractor shown in FIG. 19 includes signal input terminals 101-1–101-N, feedforward filters 102-1–102-N each formed by a tapped delay line, an adder 103 and a signal output terminal 104. Unlike the signal extractor shown in FIG. 14, since this signal extractor can perform operation on time axis, the signal extractor can not only form a single space beam but also a space-time beam. Therefore, there is a merit that signal extraction can be performed for multi-path waves occurring in high speed communication by forming beams effective for the multi-path waves.

Figure 20:
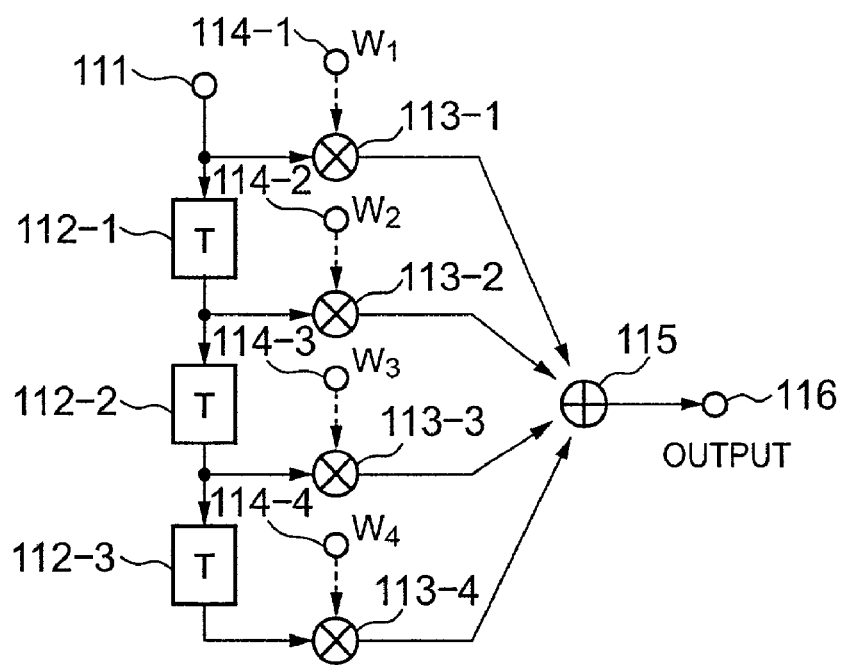
FIG. 20 shows a configuration example of a tapped delay line.

FIG. 20 shows a configuration example of the tapped delay line used for the signal extractor shown in FIG. 19. The tapped delay line shown in FIG. 20 includes a signal input terminal 111, delay elements 112-1–112-3, multipliers 113-1–113-4, weight coefficient input terminals 114-1–114-4 for the multipliers, an adder 115 and a signal output terminal 116.

Figure 21:
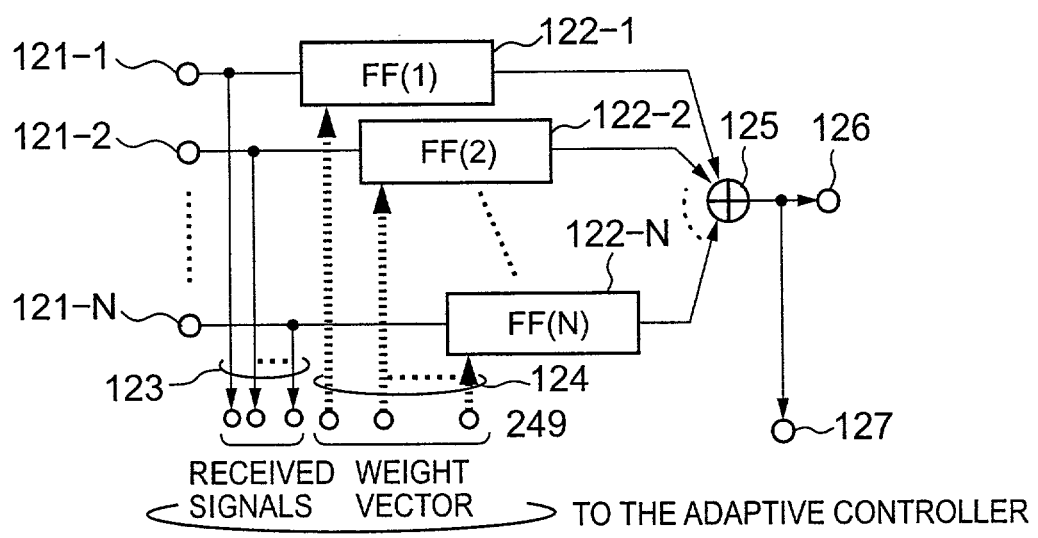
FIG. 21 shows a fourth configuration example of the signal extractor.

FIG. 21 shows a fourth configuration example of the signal extractor. This signal extractor is an example for the case coefficients of the signal extractor in FIG. 19 are adaptively estimated. The signal extractor shown in FIG. 21 includes input terminals 121-1–121-N, feedforward filters 122-1–122-N each formed by the tapped delay line shown in FIG. 20, input signal output terminals 123 to the adaptive controller, coefficient input terminals 124 from the adaptive controller, an adder 125, a signal output terminal 126, and a signal output terminal 127 to the adaptive controller.

Figure 22:
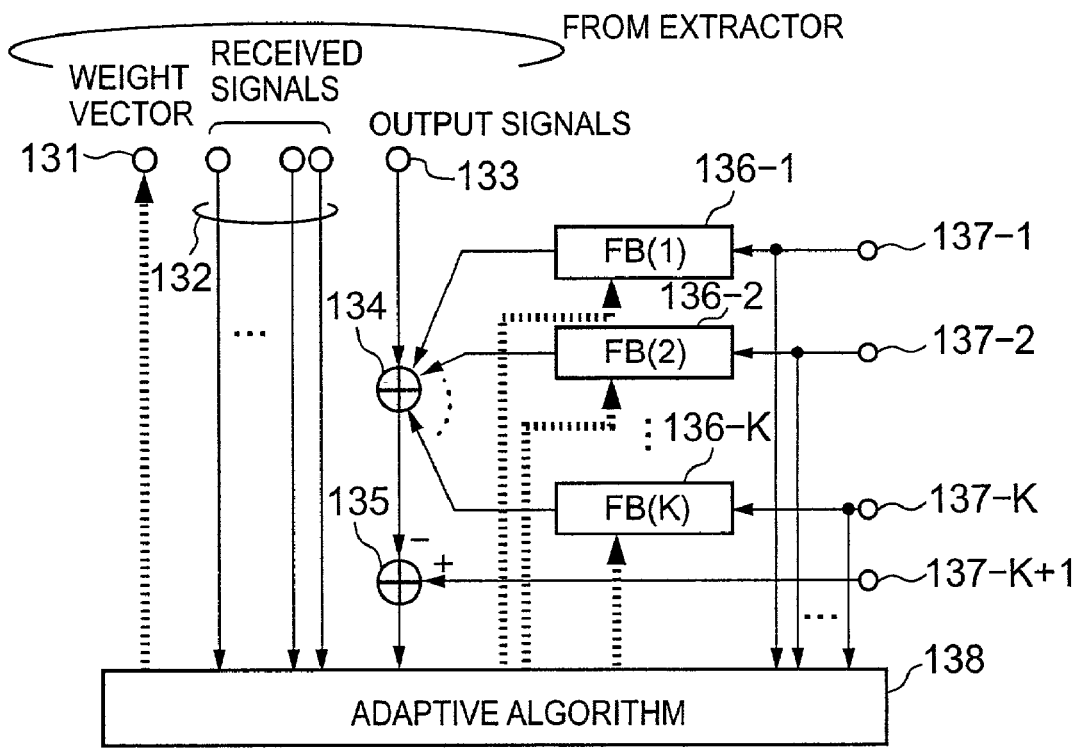
FIG. 22 shows a second configuration example of the adaptive controller.

FIG. 22 shows a second configuration example of the adaptive controller, which is an example when using the signal extractor shown in FIG. 21. The adaptive controller shown in FIG. 22 includes a coefficient output terminal 131 to the signal extractor, signal input terminals 132 from the signal extractor, an adder 134, a subtracter 135, feedback filters 136-1–136-K each formed by the tapped delay line shown in FIG. 20, tentative decision data input terminals 137-1–137-K+1 from the series estimator and an adaptive algorithm part 138.

Like the adaptive algorithm part 68 shown in FIG. 15, algorithm based on the MMSE standard is applied to the adaptive algorithm part 138. For example, when the LMS is applied, the adaptive algorithm part 138 can easily derive the algorithm by expanding variations $v_{i,j}(k)$ and $w_{i,j}(k)$ in the equations (8) and (10) to vectors according to the tapped delay line.

Figure 23:
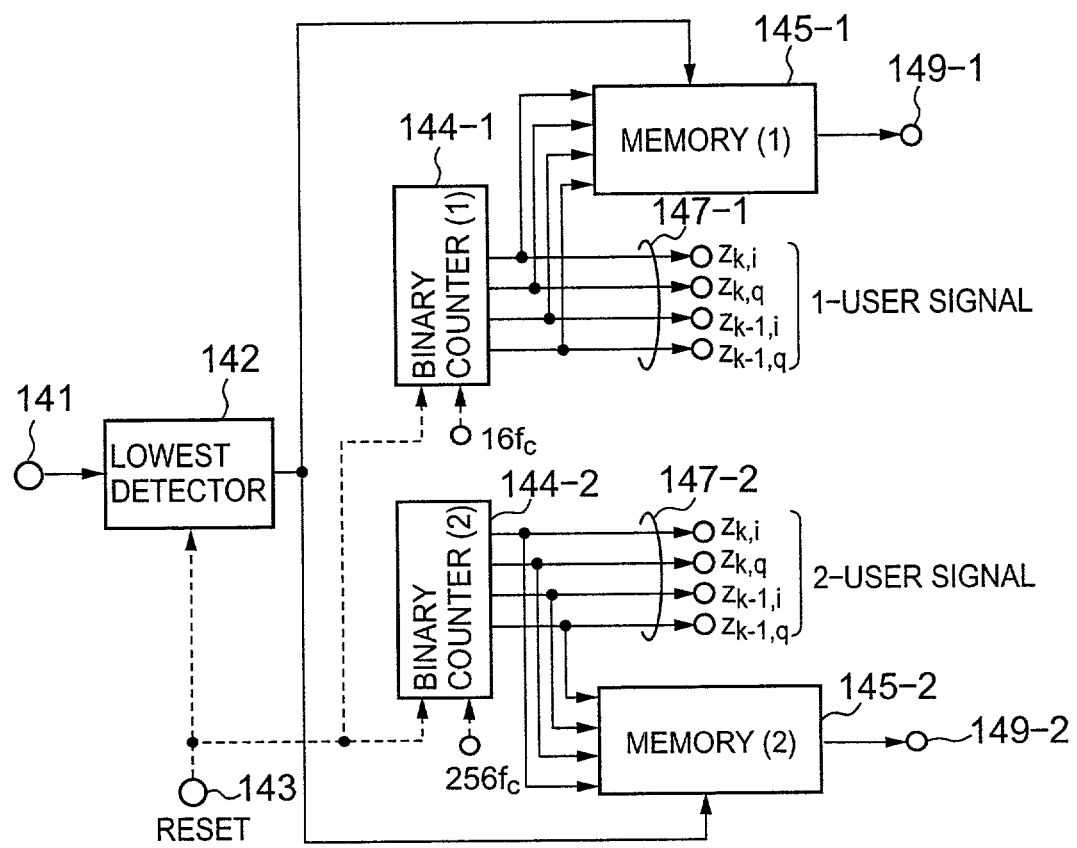
FIG. 23 shows a second configuration example of the series estimator.

FIG. 23 shows a second configuration example of the series estimator. This example is for the case using the signal extractor shown in FIGS. 19 or 21. The signal estimator shown in FIG. 23 is an example for two users each of which users uses QPSK and in the case of there is one symbol delay wave in the communication channel. The signal estimator includes an input terminal 141, a lowest value detector 142, a reset terminal 143, binary counters 144-1, 144-2, memory circuits 145-1, 145-2, tentative decision data output terminals 147-1, 147-2 and demodulated signal output terminals 149-1, 149-2. The lowest value detector 142 and the binary counters 144-1, 144-2 are reset in synchronization with a reset signal from the reset terminal 143 in a symbol period. Therefore, the lowest value detector 142 detects a lowest value in a symbol. Since $f_c$ in FIG. 23 represents a symbol frequency, the two binary counters 144-1 and 144-2 generates every pattern of QPSK. Therefore, the lowest value detector 142 estimates the lowest combination in every signal pattern to be transmitted by the two users, extracts the combination from the memory circuits 145-1 and 145-2, and outputs the combination from the demodulated signals output terminals 149-1 and 149-2.

Figure 24:
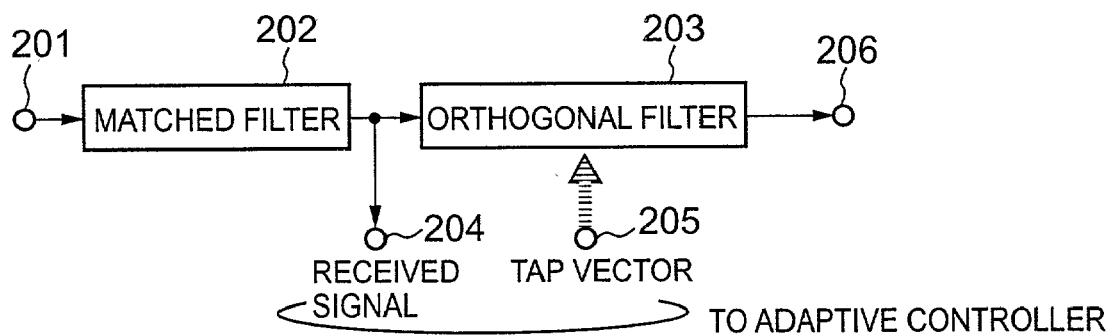
FIG. 24 shows a fifth configuration example of the signal extractor.

FIG. 24 shows a fifth configuration example of the signal extractor which is for CDMA communication. The signal extractor shown in FIG. 24 includes a signal input terminal 201, a matched filter 202 for despreading, an orthogonal filter 203, a signal output terminal 204 for outputting a signal after despread, a coefficient input terminal 205 to the orthogonal filter and a signal output terminal 206. According to this signal extractor, after despreading is performed by the matched filter 202 which has code sequence of a signal desired to be extracted as tap coefficient, undesired interference component included in the output is filtered by the orthogonal filter 203 so that only desired signal group can be obtained.

Figure 25:
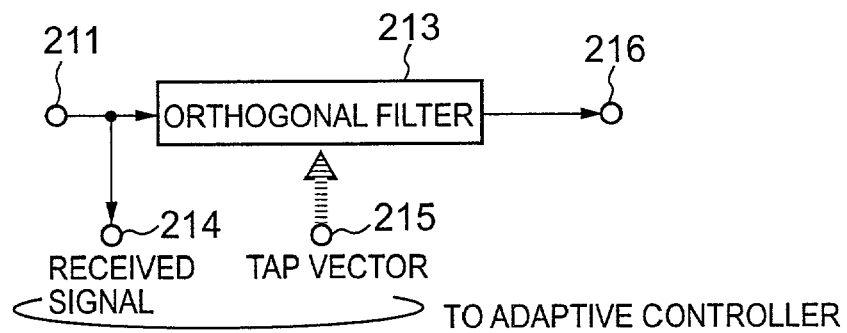
FIG. 25 shows a sixth configuration example of the signal extractor.

FIG. 25 is a sixth configuration example of the signal extractor in which the matched filter 202 and the orthogonal filter 203 are integrated to an orthogonal filter 213. The signal extractor shown in FIG. 25 includes a signal input terminal 211, an orthogonal filter 213, a received signal output terminal 214 to the adaptive controller, a coefficient input terminal 215 to the orthogonal filter and a signal output terminal 216.

Figure 26:
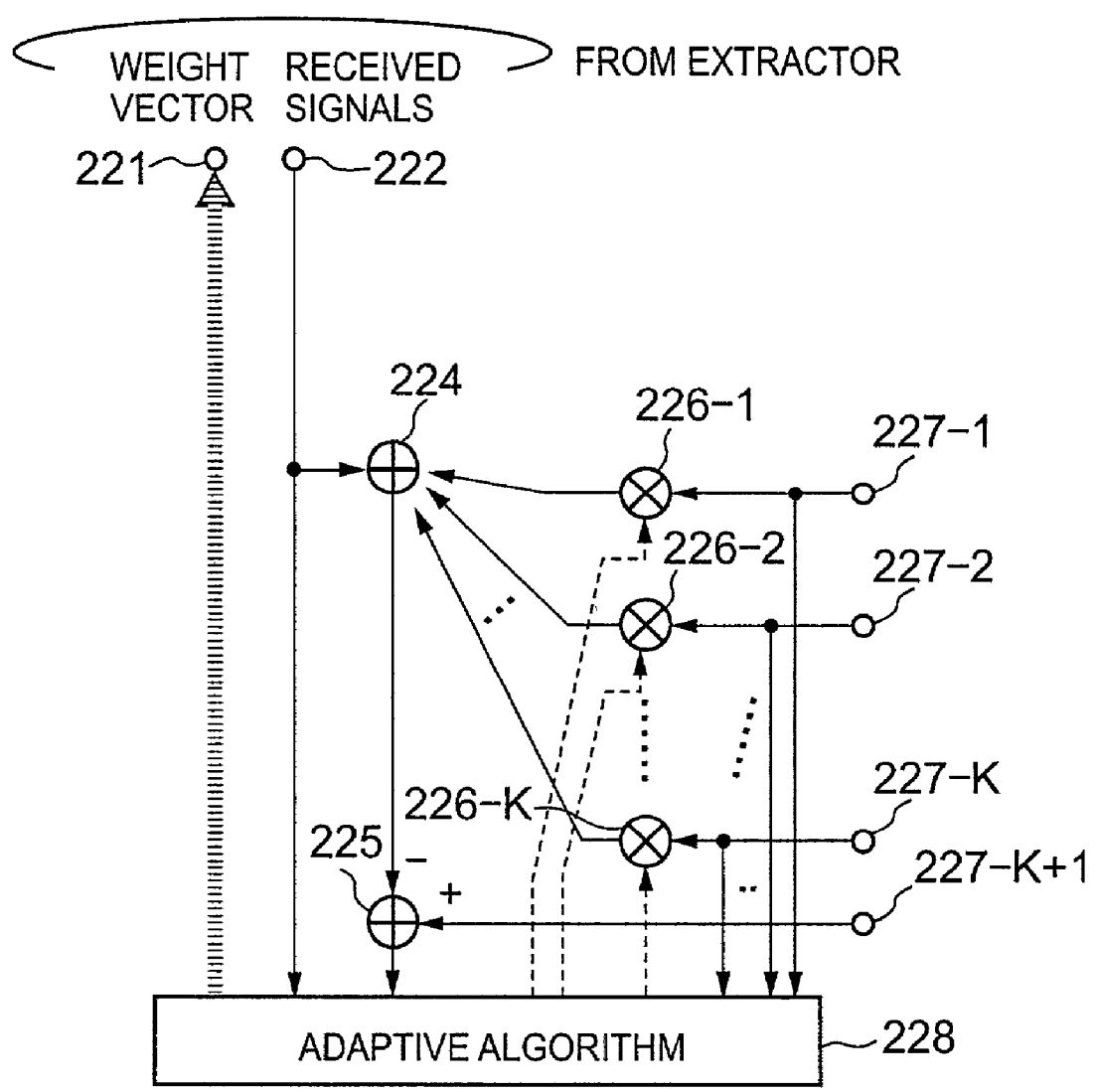
FIG. 26 shows a third configuration example of the adaptive controller.

FIG. 26 shows a third configuration example of the adaptive controller for using the signal extractor shown in FIG. 24 and FIG. 25. The adaptive controller in FIG. 26 includes a coefficient output terminal 221 to the signal extractor, a signal input terminal 222 from the signal extractor, an adder 224, a subtracter 225, multipliers 226-1–226-K, tentative decision data input terminals 227-1–227-K+1 from the series estimator, and an adaptive algorithm part 228. If $w^*_{i,j}(k) d_j(k)$ in the equation (9) is regarded as a signal from the multiplier 226 1, and $U_i(k)$ in the equation (10) is regarded as data vector to shift register of the tapped delay line of the orthogonal filter 213, the adaptive controller can perform coefficient estimation by using the equation (10).

Figure 27:
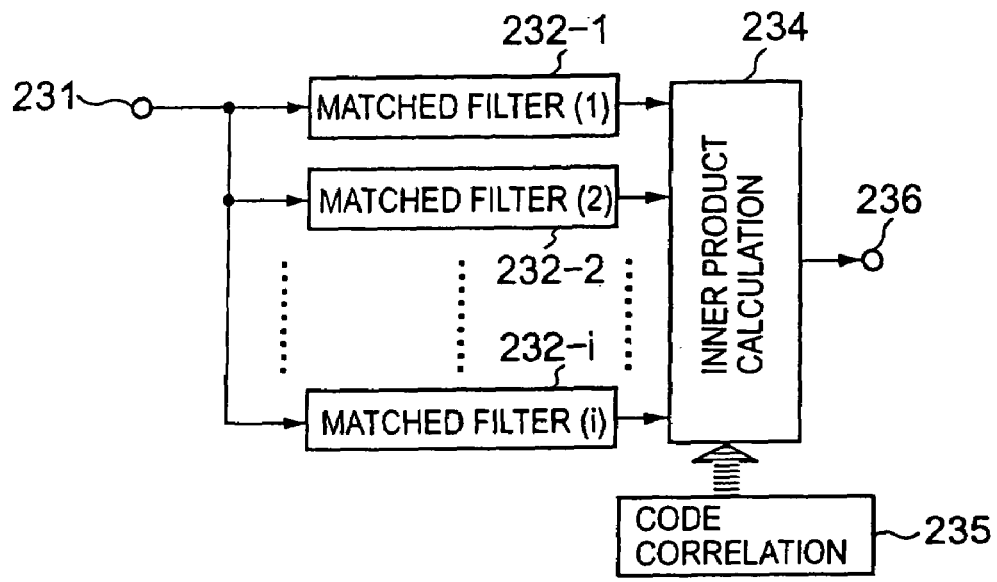
FIG. 27 shows a seventh configuration example of the signal extractor.

FIG. 27 shows a seventh configuration example of the signal extractor in which a modified decorrelating detector is applied. The signal extractor shown in FIG. 27 includes a signal input terminal 231, matched filters 232-1–232-i for despreading, a inner product calculation part 234 for calculating inner product, a correlation calculation part 235 for calculating correlation matrix between codes and outputting predetermined vectors forming the inverse matrix, and a signal output terminal 236. The signal extractor calculates correlation matrix between 1–i codes, and performs inner product operation for predetermined vectors of an inverse matrix of the correlation matrix and the matched filter. As a result, terms on correlation between 1–i codes for desired signals can be canceled. Therefore, like the antennas, only several user group signals can be extracted.

Figure 28:
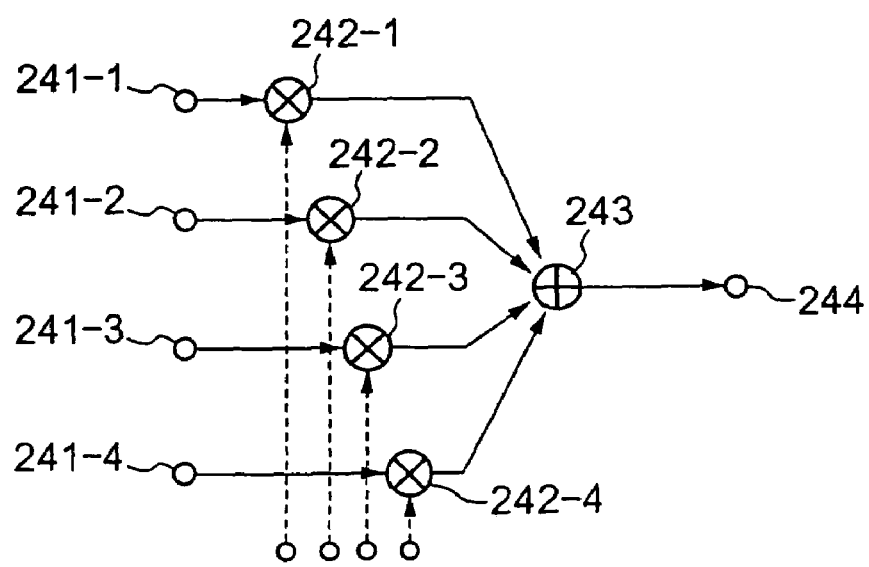
FIG. 28 shows a configuration example of an inner product calculation part.

FIG. 28 is a configuration example of the inner product calculation part used in the signal extractor of FIG. 27, The inner product calculation part shown in FIG. 28 includes signal input terminals 241-1–241-4, multipliers 242-1–242-4, an adder 243, and an output terminal 244.

Figure 29:
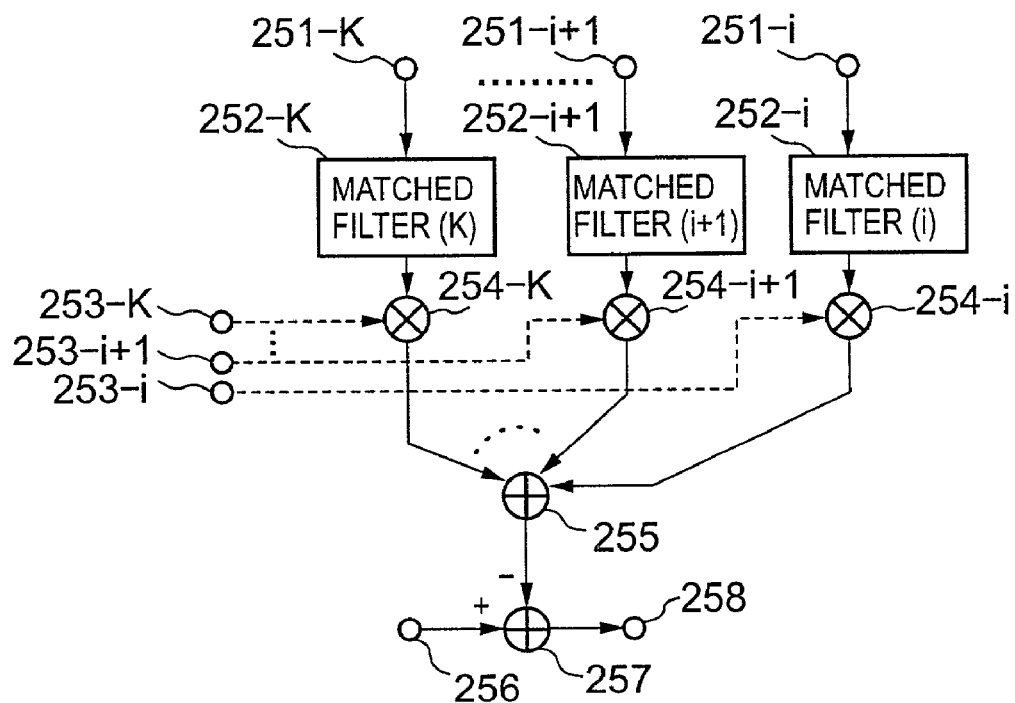
FIG. 29 shows a eighth configuration example of the signal extractor.

FIG. 29 shows a eighth configuration example of the signal extractor which is for CDMA communication. The signal extractor shown in the figure includes tentative decision data input terminals 251-i–251-K from the series estimator, matched filters 252-i–252-K, input terminals 253-i–253-K for i-K carrier phase, multipliers 254-i–254-K, an adder 255, a signal input terminal 256, a subtracter 257, and a signal output terminal 258.

Figure 30:
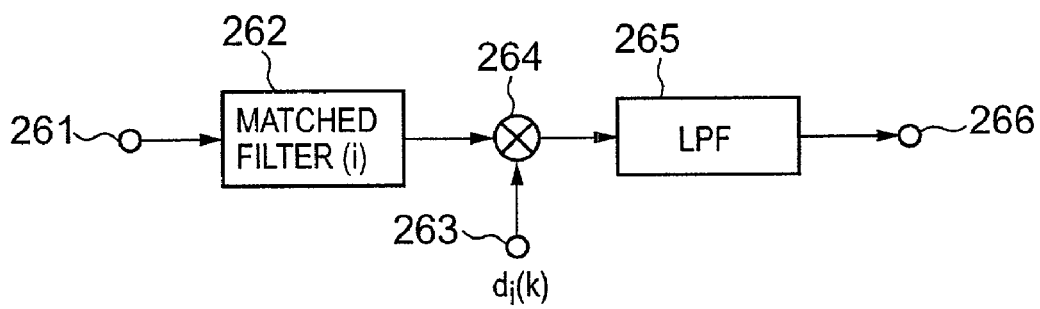
FIG. 30 is a configuration example of a carrier phase estimator.

FIG. 30 is a configuration example of a carrier phase estimator used in the signal extractor shown in FIG. 29. The carrier phase estimator shown in FIG. 30 includes a signal input terminal 261, a matched filter 262 having predetermined spreading code as tap coefficient, estimated sending signal input terminal 263 from the series estimator, a multiplier 264, a low-pass filter 265, and a signal output terminal 266.

Figure 31:
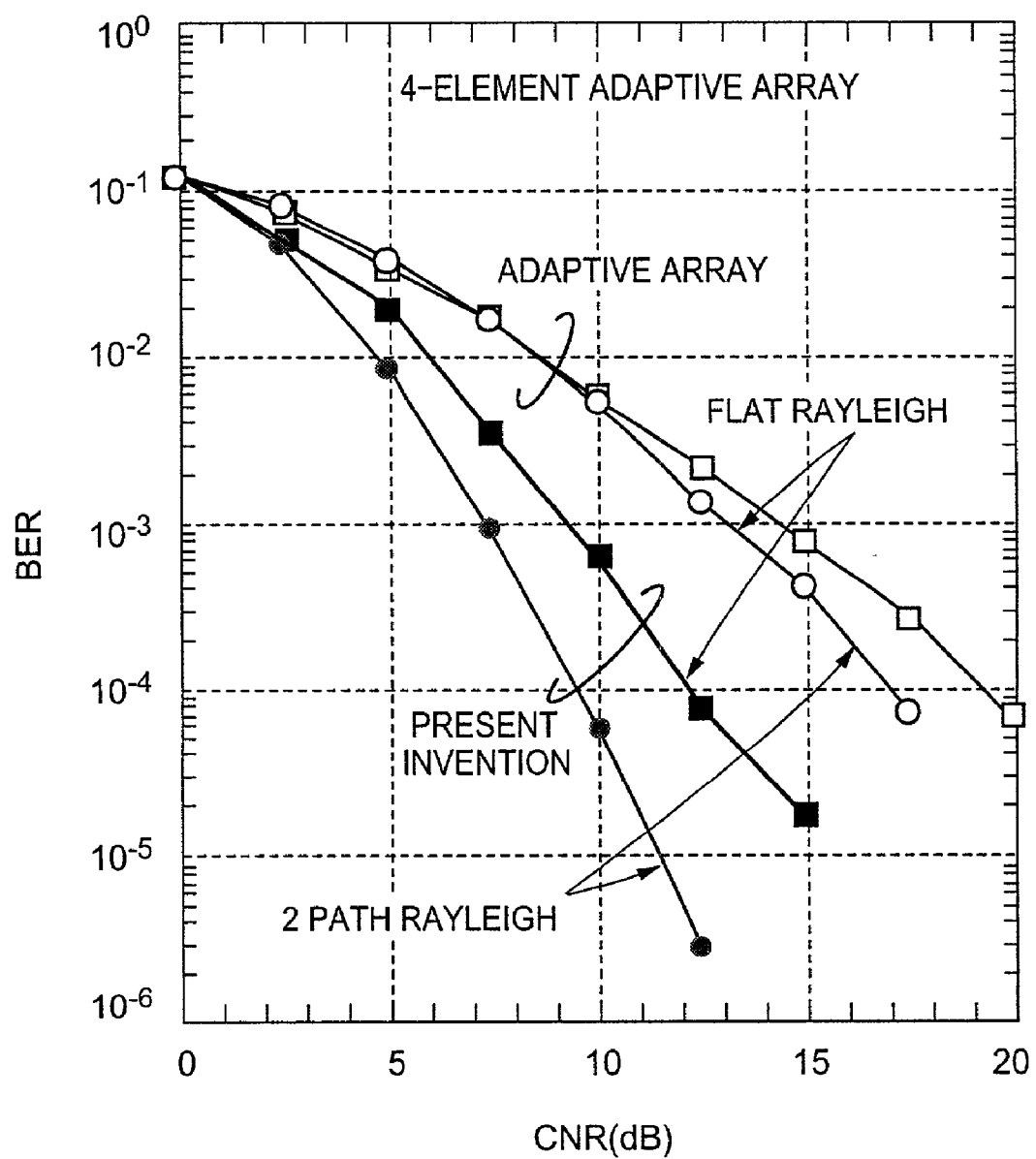
FIG. 31 shows an example of characteristics of the receiver of FIG. 11 in which the signal extractor of FIG. 21, the adaptive controller of FIG. 22, and the series estimator of FIG. 23 are applied, and characteristics when using adaptive array.

FIG. 31 shows a characteristics example of the receiver of FIG. 11 in which the signal extractor of FIG. 21, the adaptive controller of FIG. 22, and the series estimator of FIG. 23 are applied, and characteristics example when using adaptive array, in which four element array antenna is used. Also in FIG. 31, two cases of flat Rayleigh fading channel and two path Rayleigh fading are shown for the communication channel. In addition, QPSK is used for the modulation method.

As mentioned above, in the communication system performing high speed communication, signal quality degrades due to various interference. Especially, in multimedia communication, it can be predicted that signals having various transmission speed are mixed. In such cases, high speed signals cause large interference to low speed signals. In addition, in wireless communication, especially in mobile communication, a cellular system which uses the same frequency in separated areas is applied for improving frequency use efficiency. Therefore, there is a case in which a signal is transmitted to another area using the same frequency so that same channel interference may occur. In order to solve the problems, by using the receiver of the present invention, theoretical maximum interference canceling becomes possible so that communication quality can be improved. In addition, in the wireless communication system, by applying the receiving method of the present invention, high quality communication becomes possible even when there is interference to some extent. Therefore, distance between the areas where the same frequency is used need not be so large as conventional. Therefore, frequency use efficiency of plane directions can be improved.

The present invention is not limited to the specifically disclosed embodiments, and variations and modifications may be made without departing from the scope of the invention.

What is claimed is:

1. A receiving method in a receiver demodulating K user signals in a plurality of user signals transmitted on the same communication channel, said receiving method comprising the steps of:
   extracting ith to Kth user signals;
   calculating a joint probability density function that any signal set in said ith to Kth user signals will be obtained when ith to Kth user signals estimated are assumed to be received;
   multiplying probability density functions calculated in said calculating joint probability density function step so that a multiplied value is obtained; and
   estimating first to Kth user signals which maximize said multiplied value, and outputting said first to Kth user signals.

2. The receiving method as claimed in claim 1, said receiving method further comprising the steps of:
   determining which user signals should be extracted according to variation of communication channel state such that said probability density functions obtained by said joint probability calculation become maximum; and
   extracting user signals determined by said user estimation.

3. The receiving method as claimed in claim 1, said receiving method further comprising the steps of:
   determining weight parameters on the basis of received signals and ith to Kth user signals estimated according to variation of communication channel state; and
   assigning weights to said received signals by using said weight parameters.

4. The receiving method as claimed in claim 1, said receiving method further comprising the steps of:
   determining weight parameters on the basis of received signals according to variation of communication channel state, and
   assigning weights to received signals by using the weight parameters determined.

5. A receiving method in a receiver demodulating K user signals in a plurality of user signals transmitted on the same communication channel, said receiving method comprising the steps of:
   extracting ith to Kth user signals;
   calculating a logarithm of a joint probability density function that any signal set in said ith to Kth user signals will be obtained when ith to Kth user signals estimated are assumed to be received;
   adding logarithms calculated by said log likelihood calculation so that an added value is obtained; and
   estimating first to Kth user signals which maximize said added value, and outputting said first to Kth user signals.

6. The receiving method as claimed in claim 5, said receiving method further comprising the steps of:
   determining which user signals should be extracted according to variation of communication channel state such that said logarithms obtained become maximum; and
   extracting the determined user signals.

7. The receiving method as claimed in claim 5, said receiving method further comprising the steps of:
- determining weight parameters on the basis of received signals and ith to Kth user signals estimated according to variation of communication channel state; and
- assigning weights to said received signals by using said weight parameters.

8. The receiving method as claimed in claim 5, said receiving method further comprising the steps of:
- determining weight parameters on the basis of received signals according to variation of communication channel state; and
- assigning weights to received signals by using the calculated weight parameters.

9. A receiver demodulating K user signals in a plurality of user signals transmitted on the same communication channel, said receiver comprising K signal extraction parts, a signal estimation part, K joint probability calculation parts and a multiplying part, wherein:
- an ith ($1 \leq i \leq K$) signal extraction part extracts ith to Kth user signals;
- an ith joint probability calculation part calculates a joint probability density function that any signal set in said ith to Kth user signals will be obtained when ith to Kth user signals estimated by said signal estimation part are assumed to be received;
- said multiplying part multiplies probability density functions calculated by said joint probability calculation parts so that a multiplied value is obtained; and
- said signal estimation part estimates first to Kth user signals which maximize said multiplied value, and outputs said first to Kth user signals to said joint probability calculation part.

10. The receiver as claimed in claim 9, said receiver further comprising a user estimation part for determining which user signals should be extracted by said signal extraction parts according to variation of communication channel state such that said probability density functions obtained by said joint probability calculation parts become maximum,
- wherein said signal extraction parts extracts user signals determined by said user estimation part.

11. The receiver as claimed in claim 9, said receiver further comprising K adaptive control parts, wherein:
- an ith adaptive control part determines weight parameters on the basis of received signals and ith to Kth user signals estimated by said signal estimation part according to variation of communication channel state; and
- said ith signal extraction part assigns weights to said received signals by using said weight parameters.

12. The receiver as claimed in claim 9, said receiver further comprising an adaptive control part for determining weight parameters on the basis of received signals according to variation of communication channel state,
- wherein each of said signal extraction parts assigns weights to received signals by using weight parameters calculated by said adaptive control part.

13. A receiver demodulating K user signals in a plurality of user signals transmitted on the same communication channel, said receiver comprising K signal extraction parts, a signal estimation part, K log likelihood calculation parts and an adding part, wherein:
- an ith ($1 \leq i \leq K$) signal extraction part extracts ith to Kth user signals;
- an ith log likelihood calculation part calculating a logarithm of a joint probability density function that any signal set in said ith to Kth user signals will be obtained when ith to Kth user signals estimated by said signal estimation part are assumed to be received;
- said adding part adds logarithms calculated by said log likelihood calculation parts so that an added value is obtained; and
- said signal estimation part estimates first to Kth user signals which maximize said added value, and outputs said first to Kth user signals to said log likelihood calculation part.

14. The receiver as claimed in claim 13, said receiver further comprising a user estimation part for determining which user signals should be extracted by said signal extraction parts according to variation of communication channel state such that said logarithms obtained by said log likelihood calculation parts become maximum,
- wherein said signal extraction parts extract user signals determined by said user estimation part.

15. The receiver as claimed in claim 13, said receiver further comprising K adaptive control parts, wherein:
- an ith adaptive control part determines weight parameters on the basis of received signals and ith to Kth user signals estimated by said signal estimation part according to variation of communication channel state; and
- said ith signal extraction part assigns weights to said received signals by using said weight parameters.

16. The receiver as claimed in claim 13, said receiver further comprising an adaptive control part for determining weight parameters on the basis of received signals according to variation of communication channel state,
- wherein each of said signal extraction parts assigns weights to received signals by using weight parameters obtained by said adaptive control part.

* * * * *